United States Patent
Kies et al.

(10) Patent No.: US 11,960,652 B2
(45) Date of Patent: Apr. 16, 2024

(54) USER INTERACTIONS WITH REMOTE DEVICES

(71) Applicant: QUALCOMM Incorporated, San Diego, CA (US)

(72) Inventors: Jonathan Kies, Encinitas, CA (US); Leonid Sheynblat, Hillsborough, CA (US)

(73) Assignee: QUALCOMM Incorporated, San Diego, CA (US)

( * ) Notice: Subject to any disclaimer, the term of this patent is extended or adjusted under 35 U.S.C. 154(b) by 3 days.

(21) Appl. No.: 17/450,680

(22) Filed: Oct. 12, 2021

(65) Prior Publication Data

US 2023/0116190 A1    Apr. 13, 2023

(51) Int. Cl.
| | |
|---|---|
| *G06F 3/048* | (2013.01) |
| *G06F 3/01* | (2006.01) |
| *G06F 3/04815* | (2022.01) |
| *G06F 3/0482* | (2013.01) |
| *G06T 19/00* | (2011.01) |

(52) U.S. Cl.
CPC ............ *G06F 3/017* (2013.01); *G06F 3/013* (2013.01); *G06F 3/04815* (2013.01); *G06F 3/0482* (2013.01); *G06T 19/006* (2013.01)

(58) Field of Classification Search
CPC ...... G06F 3/013; G06F 3/017; G06F 3/04815; G06F 3/0482
See application file for complete search history.

(56) References Cited

U.S. PATENT DOCUMENTS

| | | | |
|---|---|---|---|
| 2013/0033649 A1* | 2/2013 | Kim | H04N 21/44218 348/E5.122 |
| 2015/0193111 A1* | 7/2015 | Kauffmann | G06F 3/017 715/825 |
| 2016/0049007 A1 | 2/2016 | Mullins et al. | |
| 2016/0313902 A1* | 10/2016 | Hill | G06F 3/0482 |
| 2017/0337742 A1 | 11/2017 | Powderly et al. | |
| 2018/0165854 A1* | 6/2018 | Du | G06T 11/00 |
| 2018/0336885 A1* | 11/2018 | Mukherjee | G06F 3/167 |
| 2019/0391716 A1 | 12/2019 | Badr et al. | |
| 2020/0401423 A1 | 12/2020 | Presant et al. | |
| 2021/0034222 A1* | 2/2021 | Brems | G06F 3/165 |
| 2021/0048938 A1 | 2/2021 | Scott, II et al. | |

OTHER PUBLICATIONS

International Search Report and Written Opinion—PCT/US2022/077812—ISA/EPO—dated Jan. 26, 2023.

* cited by examiner

*Primary Examiner* — Claudia Dragoescu
(74) *Attorney, Agent, or Firm* — QUALCOMM Incorporated

(57) ABSTRACT

Systems, methods, and non-transitory media are provided for presenting information associated with at least one input option. An example method can include receiving data identifying one or more input options associated with a first device in a scene; determining, including using at least one memory, information relevant to at least one of the scene, the first device, and a user associated with a second device; and based on the one or more input options and the information, output user guidance data corresponding to an input option for which relevant context information has been determined.

28 Claims, 18 Drawing Sheets

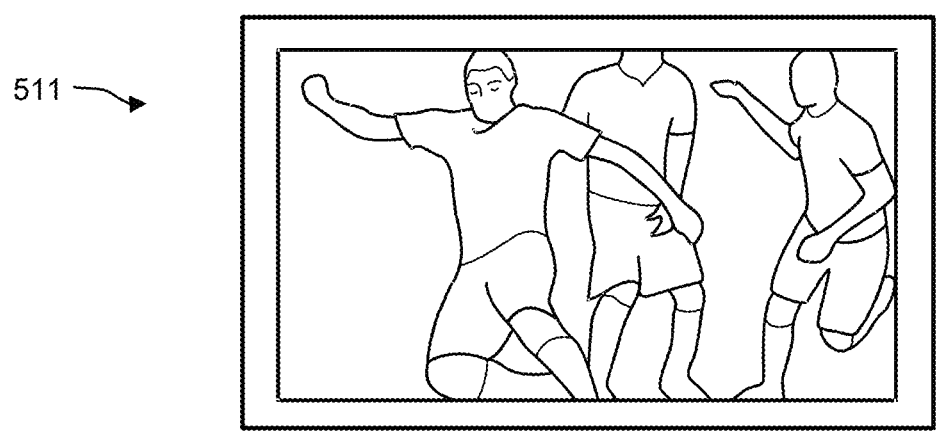
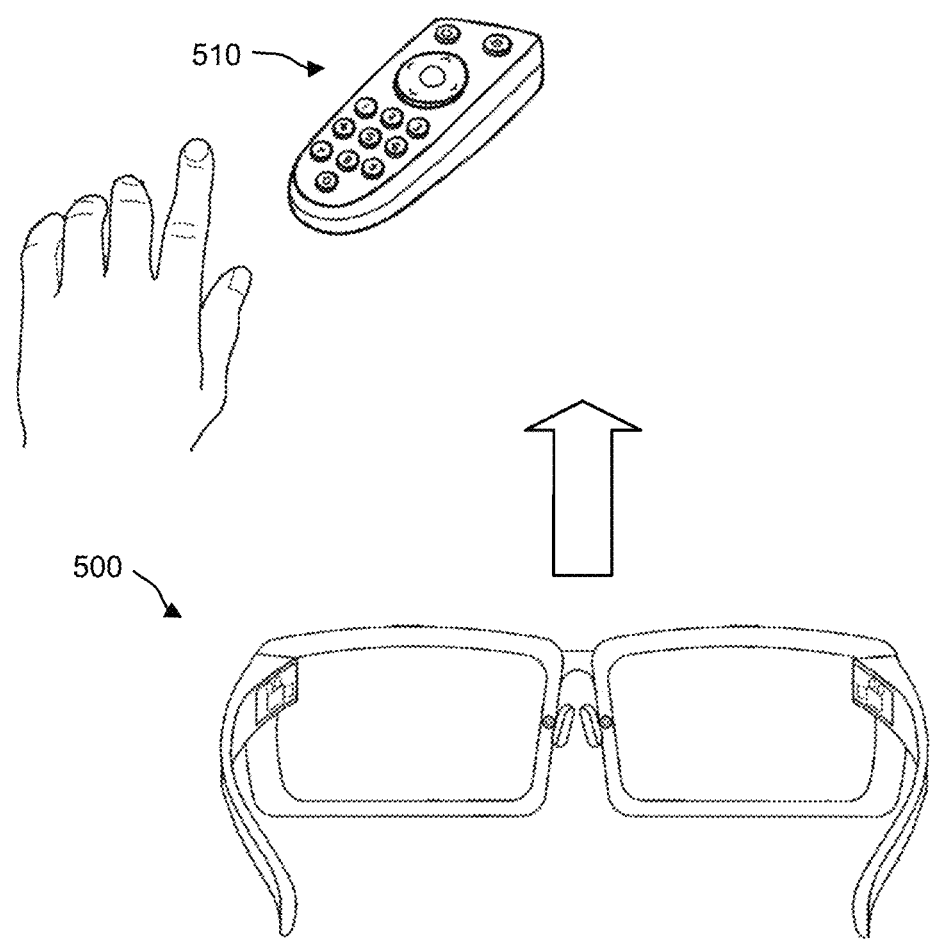
FIG. 5A

900

```
┌─────────────────────────────────────────────┐
│  RECEIVE DATA IDENTIFYING ONE OR MORE INPUT │
│    OPTIONS ASSOCIATED WITH A DEVICE IN A    │
│                   SCENE                     │
│                    902                      │
└─────────────────────────────────────────────┘
                      │
                      ▼
┌─────────────────────────────────────────────┐
│  DETERMINE INFORMATION RELATING TO AT LEAST │
│  ONE OF THE SCENE, THE DEVICE, AND A USER   │
│      ASSOCIATED WITH AN ELECTRONIC DEVICE   │
│                    904                      │
└─────────────────────────────────────────────┘
                      │
                      ▼
┌─────────────────────────────────────────────┐
│  BASED ON THE ONE OR MORE INPUT OPTIONS AND │
│   THE INFORMATION, OUTPUT USER GUIDANCE     │
│   DATA CORRESPONDING TO AN INPUT OPTION FOR │
│  WHICH RELEVANT CONTEXT INFORMATION HAS     │
│               BEEN DETERMINED               │
│                    906                      │
└─────────────────────────────────────────────┘
```

FIG. 9

USER INTERACTIONS WITH REMOTE DEVICES

TECHNICAL FIELD

The present disclosure generally relates to interactions with remote devices. For example, aspects of the present disclosure include filtering and/or suggesting virtual content for user interactions with remote devices.

BACKGROUND

Extended reality technologies can be used to present virtual content to users, and/or can combine real environments from the physical world and virtual environments to provide users with extended reality experiences. The term extended reality can encompass virtual reality, augmented reality, mixed reality, and the like. Each of these forms of extended reality allows users to experience or interact with immersive virtual environments or content. For example, an extended reality experience can allow a user to interact with a real or physical environment enhanced or augmented with virtual content.

Extended reality technologies can be implemented to enhance user experiences in a wide range of contexts, such as entertainment, healthcare, retail, education, social media, among others.

SUMMARY

Disclosed are systems, apparatuses, methods, and computer-readable media for determining user interaction data for remote device interactions (e.g., interactions between an extended reality (XR) device and one or more remote devices, such as an Internet-of-Things device). According to at least one example, a method is provided for presenting information associated with at least one input option. The method includes: receiving data identifying one or more input options associated with a device in a scene; determining, including using at least one memory, information relevant to at least one of the scene, the device, and a user associated with an electronic device; and based on the one or more input options and the information, outputting user guidance data corresponding to an input option for which relevant context information has been determined.

In another example, an apparatus for presenting information associated with at least one input option is provided that includes at least one memory and at least one processor (e.g., implemented in circuitry) coupled to the at least one memory. The at least one processor is configured to and can: receive data identifying one or more input options associated with a device in a scene; determine, including using at least one memory, information relevant to at least one of the scene, the device, and a user associated with an electronic device; and based on the one or more input options and the information, output user guidance data corresponding to an input option for which relevant context information has been determined.

In another example, a non-transitory computer-readable medium is provided that has stored thereon instructions that, when executed by one or more processors, cause the one or more processors to: receive data identifying one or more input options associated with a device in a scene; determine, including using at least one memory, information relevant to at least one of the scene, the device, and a user associated with an electronic device; and based on the one or more input options and the information, output user guidance data corresponding to an input option for which relevant context information has been determined.

In another example, an apparatus for presenting information associated with at least one input option is provided. The apparatus includes: means for receiving data identifying one or more input options associated with a device in a scene; determining, including using at least one memory, information relevant to at least one of the scene, the device, and a user associated with an electronic device; and based on the one or more input options and the information, outputting user guidance data corresponding to an input option for which relevant context information has been determined.

In some aspects, the method, non-transitory computer-readable medium, and apparatuses described above can include predicting, based on the information, a user interaction with the device; and presenting the user guidance data corresponding to the input option based on the one or more input options and the predicted user interaction.

In some examples, the user guidance data can include at least one of a user input element associated with the input option, a virtual overlay on a physical object associated with the input option, and/or a cue indicating how to provide an input associated with the input option.

In some examples, the device can include a connected device with network communication capabilities, and the method, non-transitory computer-readable medium, and apparatuses described above can include determining, based on the information and the one or more input options, a hand gesture that represents a predicted user interaction; and presenting the user guidance data. In some examples, the predicted user interaction can include a predicted user input to the device. In some cases, the user guidance data can include an indication of the hand gesture that, when detected, invokes an actual user input at the device.

In some aspects, presenting the user guidance data can include rendering, at a display associated with the electronic device, a virtual overlay configured to appear to be located on a surface of the device. In some examples, the virtual overlay can include a user interface element associated with the input option. In some cases, the user interface element can include at least one of a virtual user input object associated with the input option and a visual indication of a physical control object on the device configured to receive the input corresponding to the input option.

In some examples, the information includes at least one of an eye gaze of the user and a pose of the user, and the method, non-transitory computer-readable medium, and apparatuses described above can include predicting a user interaction with the device based on at least one of the eye gaze of the user and the pose of the user; after presenting the user guidance data, detecting an actual user input associated with the input option, the actual user input representing the predicted user interaction; and transmitting, to the device, a command corresponding to the actual user input associated with the input option.

In some examples, outputting the user guidance data corresponding to the input option can include displaying the user guidance data. In some examples, outputting the user guidance data corresponding to the input option can include outputting audio data representing the user guidance data.

In some examples, outputting the user guidance data corresponding to the input option can include displaying the user guidance data; and outputting audio data associated with the displayed user guidance data.

In some aspects, the method, non-transitory computer-readable medium, and apparatuses described above can include receiving, from the device, data identifying the one or more input options associated with the device. In some aspects, the method, non-transitory computer-readable medium, and apparatuses described above can include receiving, from a server, the data identifying the one or more input options associated with the device.

In some cases, the device has no external user interface for receiving one or more user inputs.

In some aspects, the method, non-transitory computer-readable medium, and apparatuses described above can include refraining, based on the information, from presenting additional user guidance data associated with the device.

In some aspects, the method, non-transitory computer-readable medium, and apparatuses described above can include, after presenting the user guidance data, obtaining a user input associated with the input option; and transmitting, to the device, an instruction corresponding to the user input. In some cases, the instruction can be configured to control one or more operations of the device.

In some aspects, the apparatus comprises a camera, a mobile device (e.g., a mobile telephone or so-called "smart phone" or other mobile device), a wearable device, an extended reality device (e.g., a virtual reality (VR) device, an augmented reality (AR) device, or a mixed reality (MR) device), a personal computer, a laptop computer, a server computer, or other device. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following drawing figures:

FIG. 5A and FIG. 5B are diagrams illustrating an example of a user using an XR system to interact with a remote control that can control a television, in accordance with some examples of the present disclosure;

FIG. 9 is a flow diagram illustrating an example of a process for presenting information associated with at least one input option, in accordance with some examples of the present disclosure.

DETAILED DESCRIPTION

Figure 1:
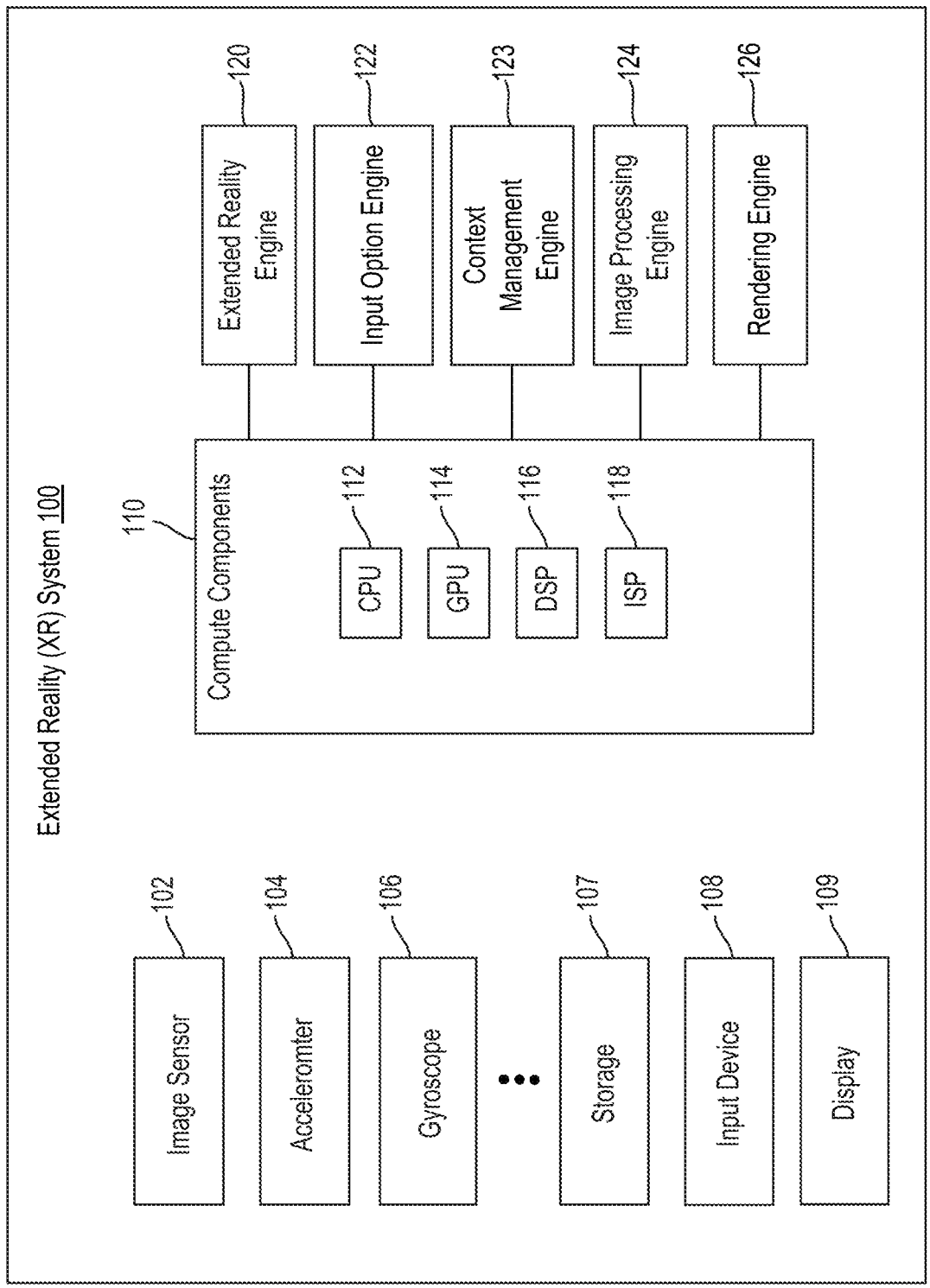
FIG. 1 is a block diagram illustrating an example extended reality (XR) system, in accordance with some examples of the present disclosure.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Users often interact with different devices that may provide certain functionalities of interest to the users. For example, a user may interact with smart devices (e.g., Internet-of-Things (IoT) or other network-connected devices), mobile devices, control devices (e.g., a remote control for a television, appliance, speaker, etc.), system control panels, appliances, etc. In various illustrative examples, a user may interact with a network-connected television to manage viewing content or to change a power setting of the network-connected television, a network-connected lightbulb to control the light emitted by the network-connected lightbulb or the operation of the network-connected lightbulb, a network router to configure an operation and settings of the network router, a network-connected thermostat to control a temperature or configuration setting of the network-connected thermostat, etc.

In some cases, a device may include a hardware user interface or may present a graphical user interface (e.g., by displaying the user interface using a display or other technology), which a user can use to interact with the device. However, in some cases, the user may have difficulty interacting with the device through the user interface of the device. In one example, the user interface may be out of reach to the user, which can prevent (or make it difficult for) the user from interacting with the user interface associated with the device. As another example, the content displayed by the user interface may be in a language that the user does not understand, may be too small for the user to recognize, or otherwise cumbersome for the user to use the user interface. In some examples, the input options (e.g., supported inputs, supported input methods, etc.) associated with the device may not be readily apparent or easily understood by the user (e.g., gesture or voice commands as opposed to user interface inputs, etc.), which can make it difficult for the user to interact with the device. In other examples, the user interface may not have accessibility settings (or adequate accessibility settings) to assist a user with visual, voice, and/or hearing impairments. In some cases, a device may not have outward/external controls that are visible or otherwise accessible to a user and/or may not include a display to present a user interface that the user can use to interact with the device. Moreover, in many cases, a scene may include multiple remote devices such as, for example, connected light bulbs, televisions, connected plugs, connected speakers, etc. In such cases when there are multiple devices in the scene, it can be difficult for a user device to interact with and/or manage interactions with a particular remote device from the multiple devices in the scene.

For example, a room (e.g., a kitchen, a bedroom, an office, a living room, etc.) may have multiple devices that have connectivity and/or interaction capabilities. To initiate and/or manage a communication and/or interaction with one of the multiple devices, a user device may have difficulty identifying the particular device from the multiple devices, managing and/or simplifying user interactions and/or associated data with that particular device, managing relevant content for that particular device, etc. In some cases, the user device may obtain interaction data (e.g., input options/capabilities, inputs, outputs, graphical user interfaces, user interaction assistance data, etc.) from multiple devices in the scene. If the user device does not have sufficient knowledge and/or understanding of the scene and/or the current context and/or does not receive clear instructions from a user, the user device may be overloaded with data (e.g., interaction data, device data, etc.). In some examples, the user device may have difficulty managing content and/or interactions with one or more of the multiple devices in the scene. However, the systems and techniques described herein can allow the user device to constrain, limit, filter, declutter, etc., the virtual content associated with a remote device in the scene based on context information. In some cases, using the systems and techniques described herein, the user device can refine the content processed and/or presented for communications/interactions with a remote device in the scene, and/or can present the content in a way that best suits/fits the context (e.g., large, small, overlaid, world locked, head or device locked, etc.). In some examples, the user device can use the context information to understand how to interact with a particular remote device in the scene, what interaction data and/or virtual content is relevant to that particular remote device, how to manage interactions with any of the remote devices in the scene, etc.

As further described herein, in many cases, the systems and techniques described herein can allow a device to unify and/or simplify user interactions with remote devices in a scene. In the above-noted cases, the device can better manage, unify, simplify, and/or facilitate communications and/or interactions with remote devices in the scene. In some cases, the device can facilitate and/or support user interactions with one or more remote devices even in more challenging scenes and/or conditions. To illustrate, a user and/or a device associated with the user may have difficulty interacting with a device. For example, a user may struggle to interact with a television remote control under poor lighting conditions, when the remote control is out of reach to the user, or when the buttons of the remote control are otherwise difficult for the user to see/understand (e.g., because of user impairments, the size of the buttons, the language of labels of the buttons, etc.). As another example, a user may struggle to interact with a network router or a connected device (e.g., a network-connected thermostat, lightbulb, speaker, camera, appliance, switch, etc.) that does not have external controls, particularly if the user is unable to access a user interface for interacting with the network router or IoT device. As yet another example, a user may struggle to interact with a control panel, such as a vehicle or elevator control panel, if the control panel (or certain controls of the control panel) is out of reach to the user or the user does not know which controls to use for a desired operation/interaction.

As described in more detail herein, systems, apparatuses, methods (also referred to as processes, and computer-readable media (collectively referred to herein as "systems and techniques") are described herein for improving, unifying, simplifying, and/or facilitating user interactions with remote devices. In some examples, an electronic device can unify, simplify, and/or facilitate interactions with other devices such as, for example, connected devices (e.g., network-connected devices), mobile devices, devices that lack outward/external controls, devices that lack a display and/or user interface, devices that have certain characteristics that present one or more challenges (e.g., devices with interfaces in different languages, that are not recognized/understood by the user, with limited accessibility options, etc.) to a user wishing to interact with such devices, devices that have controls/interfaces that are out of reach to the user, and/or any other devices. In some examples, the electronic device configured to facilitate interactions with other devices can include a smart phone, a smart wearable device (e.g., a smart watch, smart earbuds, etc.), an extended reality (XR) system or device (e.g., smart glasses, a head-mounted display (HMD), etc.), etc. While examples are described herein using an XR system as an example of an electronic device that can implement the techniques described herein, the techniques can be performed using other electronic devices (e.g., a mobile device, a smart wearable device, etc.).

In general, XR systems or devices can provide virtual content to a user and/or can combine real-world or physical environments and virtual environments (made up of virtual content) to provide users with XR experiences. The real-world environment can include real-world objects (also referred to as physical objects), such as books, people, vehicles, buildings, tables, chairs, and/or other real-world or physical objects. XR systems or devices can facilitate interaction with different types of XR environments (e.g., a user can use an XR system or device to interact with an XR environment). XR systems can include virtual reality (VR) systems facilitating interactions with VR environments, augmented reality (AR) systems facilitating interactions with AR environments, mixed reality (MR) systems facilitating interactions with MR environments, and/or other XR systems. As used herein, the terms XR system and XR device are used interchangeably. Examples of XR systems or devices include HMDs, smart glasses (e.g., network-connected glasses that can communicate using a communications network), among others.

AR is a technology that provides virtual or computer-generated content (referred to as AR content) over the user's view of a physical, real-world scene or environment. AR content can include virtual content, such as video, images, graphic content, location data (e.g., global positioning system (GPS) data or other location data), sounds, any combination thereof, and/or other augmented content. An AR system or device is designed to enhance (or augment), rather than to replace, a person's current perception of reality. For example, a user can see a real stationary or moving physical object through an AR device display (e.g., lenses of AR glasses), but the user's visual perception of the physical object may be augmented or enhanced by a virtual image of that object (e.g., a real-world car replaced by a virtual image of a DeLorean), by AR content added to the physical object (e.g., virtual wings added to a live animal), by AR content displayed relative to the physical object (e.g., informational virtual content displayed near a sign on a building, a virtual coffee cup virtually anchored to (e.g., placed on top of) a real-world table in one or more images, etc.), and/or by displaying other types of AR content. Various types of AR systems can be used for gaming, entertainment, and/or other applications.

In some cases, two types of AR systems that can be used to provide AR content include video see-through (also referred to as video pass-through) displays and optical see-through displays. Video see-through and optical see-through displays can be used to enhance a user's visual perception of real-world or physical objects. In a video see-through system, a live video of a real-world scenario is displayed (e.g., including one or more objects augmented or enhanced on the live video). A video see-through system can be implemented using a mobile device (e.g., video on a mobile phone display), an HMD, or other suitable device that can display video and computer-generated objects over the video.

An optical see-through system with AR features can display AR content directly onto the view of the real-world scene (e.g., without displaying video content of the real-world scene). For example, the user may view physical objects in the real-world scene through a display (e.g., glasses or lenses), and the AR system can display AR content (e.g., projected or otherwise displayed) onto the display to provide the user with an enhanced visual perception of one or more real-world objects. Examples of optical see-through AR systems or devices are AR glasses, an HMD, another AR headset, or other similar device that can include a lens or glass in front of each eye (or a single lens or glass over both eyes) to allow the user to see a real-world scene with physical objects directly, while also allowing an enhanced image of that object or additional AR content to be projected onto the display to augment the user's visual perception of the real-world scene.

VR provides a complete immersive experience in a three-dimensional computer-generated VR environment or video depicting a virtual version of a real-world environment. The VR environment can be interacted with in a seemingly real or physical way. As a user experiencing a VR environment moves in the real world, images rendered in the virtual environment also change, giving the user the perception that the user is moving within the VR environment. For example, a user can turn left or right, look up or down, and/or move forwards or backwards, thus changing the user's point of view of the VR environment. The VR content presented to the user can change accordingly, so that the user's experience is as seamless as in the real world. VR content can include VR video in some cases, which can be captured and rendered at very high quality, potentially providing a truly immersive virtual reality experience. Virtual reality applications can include gaming, training, education, sports video, online shopping, among others. VR content can be rendered and displayed using a VR system or device, such as a VR HMD or other VR headset, which fully covers a user's eyes during a VR experience.

MR technologies can combine aspects of VR and AR to provide an immersive experience for a user. For example, in an MR environment, real-world and computer-generated objects can interact (e.g., a real person can interact with a virtual person as if the virtual person were a real person).

In some cases, an XR system can track parts of the user (e.g., a hand and/or fingertips of a user) to allow the user to interact with items of virtual content. An XR system, such as smart glasses or an HMD, can implement cameras and/or one or more sensors to track the position of the XR system and other objects within the physical environment in which the XR system is located. XR systems can use such tracking information to provide a user of an XR system with a realistic XR experience. For example, an XR system can allow a user to experience or interact with immersive virtual environments or content. To provide realistic XR experiences, some XR systems or devices can integrate virtual content with the physical world. In some cases, XR systems or devices can match the relative pose and movement of objects and devices. For example, an XR system can use tracking information to calculate the relative pose of devices, objects, and/or maps of the real-world environment in order to match the relative position and movement of the devices, objects, and/or other portions of the real-world environment. Using the pose and movement of one or more devices, objects, and/or other portions of the real-world environment, the XR system can anchor content to the real-world environment in a manner that appears realistic to the user of the XR system. The relative pose information can be used to match virtual content with the user's perceived motion and the spatio-temporal state of the devices, objects, and other portions of the real-world environment.

In some examples, an XR system can be used to provide user guidance data for interacting with one or more other devices, such as one or more connected devices, remote controllers, control panels, mobile devices, etc. According to the systems and techniques described herein, the XR system can be leveraged to enable more intuitive and natural content and/or interactions with the other devices. In some examples, the XR system can detect the other device in a scene, and facilitate and/or manage interactions with the other device. In some cases, the XR system can have a previously-established connection (e.g., a pairing, etc.) with the other device, which can allow the XR system detect the other device in the scene. In other examples, the XR system can maintain a map of the scene including other devices situated in the scene, which the XR system can use to detect the other device when the XR system is in the scene. In some examples, the XR system can use one or more sensors, such as an image sensor, an audio sensor, a radar sensor, a LIDAR sensor, etc., which the XR system can use to sense the other device in the scene. In some cases, the XR system can use context information associated with the scene to determine that the other device is in the scene. For example, the XR system can include context information about the scene and/or the other device which indicates to the XR device that the other device is present in the scene. When the XR system is in the scene, the XR system can determine, based on the context information, that the other device is in the scene. The XR system can obtain information from the other device detected in the scene to facilitate, manage, etc., interactions with the other device.

For example, the XR system can obtain, from the other device detected in the scene, input data indicating or identifying one or more input options for the other device and/or context information associated with the scene, the other device, and/or the XR system. The XR system can process the input data and/or context information, and present a user using (e.g., wearing) the XR system with a user interface, virtual content, and/or input options for interacting with (e.g., controlling, accessing content, accessing status information, accessing outputs, etc.) the device. In some cases, the XR system can also be used to control the other device in the scene based on the input data and/or context information, as further described herein.

In some examples, the XR system can obtain or receive the input data indicating the one or more input options from the other device, from a server (e.g., a cloud-based server involved with operation of the other device), and/or from another source. The input data can indicate some or all input options that can be used to interact with the other device, such as input types (e.g., gesture based, voice based, touch based, etc.), functionality based on particular inputs (e.g., a swipe to the right can cause a thermostat to increase the temperature, etc.), among other information. In some examples, if a device does not communicate any input data to the XR system (e.g., after the XR system sends a request to the device), the XR system can determine or infer that the device does not have an ability to communicate with the XR system (e.g., over a wireless network). In such examples, the XR system can present instructions or other information (e.g., highlighted a particular button on the device) to help the user determine how to interact with the device.

The XR system can use the context information to determine content, input options, user interface, and/or modalities to output for the user to use for interacting with other devices. In some examples, the XR system can obtain or receive the context information locally (e.g., using one or more sensors of the XR system, such as one or more cameras, one or more inertial measurement units (IMUs), etc.) and/or from one or more remote sources (e.g., a server, the cloud, the Internet, the other devices, one or more sensors, etc.). The context information can be related to the other device (which the user can interact with using the XR system), a scene or environment in which the XR system and/or the other device are located, the user of the XR system attempting to interact with the other device, and/or other context at any given point in time. For instance, the context information can include an intended user interaction with the other device, one or more actions of the user in the scene, characteristics or personal information associated with the user, historical information associated with the user and the other device (e.g., past use of the device by the user, etc.), a user interface capability of the other device (e.g., whether it has outward/external controls that are visible or otherwise accessible to a user), information associated with the other device (e.g., how far the other device is from the XR system), information associated with the scene (e.g., lighting, noise, etc.), and/or other information.

The context information can provide the XR system with contextual awareness of the situation/context associated with the user, the XR system, the other device(s), the scene, etc. Using the context information and the data identifying the input options associated with another device, the XR system can output (e.g., present, provide, generate, etc.) user interaction data corresponding to one or more input options that enable user interactions with the other device. In some cases, the XR system can present visual content/data corresponding to the one or more input options. For instance, the user interaction data can include one or more user interface elements associated with an input option, a cue indicating how to provide an input associated with the input option, and/or other data. In some cases, the XR system can alternatively or additionally output non-visual data corresponding to the one or more input options. For example, the XR system can output haptics and/or audio information, such as an audio cue or instruction corresponding to the one or more input options.

The context information can enable the XR system to output content (e.g., visual virtual content, audio content, haptic feedback, etc.) that is contextually appropriate given the situation/context associated with the user, the XR system, the other device, the scene, and/or that otherwise facilitates interactions with the other devices. In some examples, the XR system can use the context information to simplify the user interactions and/or associated data/content. For example, in some cases, the other device may have a multitude of input functionalities/capabilities. The XR system can use the context information to filter the input options associated with the device that are relevant to the XR system and/or current context. The XR system can output a filtered/reduced number of input options to simplify user interactions, user interaction data/content, etc.

As noted above, the XR system can use the input data and the context information to render a user interface and/or input options for the user to interact with the other device from the XR system. In some cases, the XR system can communicate with the other device to provide inputs/commands to the other device based on user interactions with the user interface rendered by the XR system. For instance, the XR system can display the user interface so that it appears to the user as an overlay on the other device or a portion of the other device (e.g., a control, a surface, a display, a panel, etc.) to facilitate user interactions with the other device. The XR system can detect and translate user interactions with the user interface to generate control commands and/or user interaction instructions. For example, the XR system can detect a user gesture and/or an input through a device (e.g., through the XR system and/or a controller) and interpret/translate such user gesture and/or input as an interaction with the user interface. The XR system can then generate a command/instruction for controlling the other device based on the interpreted/translated user gesture and/or input. The interactions with the overlaid user interface can be used by the XR system to control the other device based on user inputs and/or access data/outputs from the other device. In some cases, to facilitate and/or improve user interactions with other devices, an XR system may localize and/or map the other device so that the XR system can accurately render a user interface relative to the other device or a portion of the other device.

In some examples, the XR system can present a user interface overlaid over a scene in a world locked or screen locked manner, to provide user interaction guidance data and/or input options to a user through the user interface. In some cases, the overlay can include one or more graphical user interface elements with guidance information indicating to the user how to interact with the one or more graphical user interface elements.

Further details regarding generation of virtual private spaces are provided herein with respect to various figures. FIG. 1 is a diagram illustrating an example extended reality (XR) system 100, in accordance with some aspects of the disclosure. The XR system 100 can run (or execute) XR applications and implement XR operations. In some examples, the XR system 100 can perform tracking and localization, mapping of the physical world (e.g., a scene), and positioning and rendering of virtual content on a display 109 as part of an XR experience. For example, the XR system 100 can generate a map (e.g., a three-dimensional (3D) map) of a scene in the physical world, track a pose (e.g., location and position) of the XR system 100 relative to the scene (e.g., relative to the 3D map of the scene), position and/or anchor virtual content in a specific location(s) on the map of the scene, and render the virtual content on the display 109 such that the virtual content appears to be at a location in the scene corresponding to the specific location on the map of the scene where the virtual content is positioned and/or anchored. The display 109 can include a glass, a screen, one or more lenses, a projector, and/or other display mechanism that allows a user to see the real-world environment and also allows XR virtual content to be displayed thereon.

In this illustrative example, the XR system 100 includes one or more image sensors 102, an accelerometer 104, a gyroscope 106, storage 107, compute components 110, an XR engine 120, an input option engine 122, a context management engine 123, an image processing engine 124, and a rendering engine 126. It should be noted that the components 102-126 shown in FIG. 1 are non-limiting examples provided for illustrative and explanation purposes, and other examples can include more, less, or different components than those shown in FIG. 1. For example, in some cases, the XR system 100 can include one or more other sensors (e.g., one or more inertial measurement units (IMUs) other than the accelerometer 104 and gyroscope 106, radars, light detection and ranging (LIDAR) sensors, audio sensors, etc.), one or more display devices, one more other processing engines, one or more other hardware components, and/or one or more other software and/or hardware components that are not shown in FIG. 1. An example architecture and example hardware components that can be implemented by the XR system 100 are further described below with respect to FIG. 9.

Moreover, for simplicity and explanation purposes, the one or more image sensors 102 will be referenced herein as an image sensor 102 (e.g., in singular form). However, one of ordinary skill in the art will recognize that the XR system 100 can include a single image sensor or multiple image sensors. Also, references to any of the components (e.g., 102-126) of the XR system 100 in the singular or plural form should not be interpreted as limiting the number of such components implemented by the XR system 100 to one or more than one. For example, references to an accelerometer 104 in the singular form should not be interpreted as limiting the number of accelerometers implemented by the XR system 100 to one. One of ordinary skill in the art will recognize that, for any of the components 102-126 shown in FIG. 1, the XR system 100 can include only one of such component(s) or more than one of such component(s).

The XR system 100 includes or is in communication with (wired or wirelessly) an input device 108. The input device 108 can include any suitable input device, such as a touchscreen, a pen or other pointer device, a keyboard, a mouse, a button or key, a microphone for receiving voice commands, a gesture input device for receiving gesture commands, any combination thereof, and/or other input device. In some cases, the image sensor 102 can capture images that can be processed for interpreting gesture commands.

The XR system 100 can be part of, or implemented by, a single computing device or multiple computing devices. In some examples, the XR system 100 can be part of an electronic device (or devices) such as an extended reality head-mounted display (HMD) device, extended reality glasses (e.g., augmented reality or AR glasses), a camera system (e.g., a digital camera, an IP camera, a video camera, a security camera, etc.), a telephone system (e.g., a smartphone, a cellular telephone, a conferencing system, etc.), a desktop computer, a laptop or notebook computer, a tablet computer, a set-top box, a smart television, a display device, a gaming console, a video streaming device, an IoT (Internet-of-Things) device, and/or any other suitable electronic device(s).

In some implementations, the one or more image sensors 102, the accelerometer 104, the gyroscope 106, storage 107, compute components 110, XR engine 120, input option engine 122, context management engine 123, image processing engine 124, and rendering engine 126 can be part of the same computing device. For example, in some cases, the one or more image sensors 102, the accelerometer 104, the gyroscope 106, storage 107, compute components 110, XR engine 120, input option engine 122, context management engine 123, image processing engine 124, and rendering engine 126 can be integrated into an HMD, extended reality glasses, smartphone, laptop, tablet computer, gaming system, and/or any other computing device. However, in some implementations, the one or more image sensors 102, the accelerometer 104, the gyroscope 106, storage 107, compute components 110, XR engine 120, input option engine 122, context management engine 123, image processing engine 124, and rendering engine 126 can be part of two or more separate computing devices. For example, in some cases, some of the components 102-126 can be part of, or implemented by, one computing device and the remaining components can be part of, or implemented by, one or more other computing devices.

The storage 107 can be any storage device(s) for storing data. Moreover, the storage 107 can store data from any of the components of the XR system 100. For example, the storage 107 can store data from the image sensor 102 (e.g., image or video data), data from the accelerometer 104 (e.g., measurements), data from the gyroscope 106 (e.g., measurements), data from the compute components 110 (e.g., processing parameters, preferences, virtual content, rendering content, scene maps, tracking and localization data, object detection data, privacy data, XR application data, face recognition data, occlusion data, etc.), data from the XR engine 120, data from the input option engine 122, data from the context management engine 123, data from the image processing engine 124, and/or data from the rendering engine 126 (e.g., output frames). In some examples, the storage 107 can include a buffer for storing frames for processing by the compute components 110.

The one or more compute components 110 can include a central processing unit (CPU) 112, a graphics processing unit (GPU) 114, a digital signal processor (DSP) 116, and/or an image signal processor (ISP) 118. The compute components 110 can perform various operations such as image enhancement, computer vision, graphics rendering, extended reality (e.g., tracking, localization, pose estimation, mapping, content anchoring, content rendering, etc.), image/video processing, sensor processing, recognition (e.g., text recognition, facial recognition, object recognition, feature recognition, tracking or pattern recognition, scene recognition, occlusion detection, etc.), machine learning, filtering, and any of the various operations described herein. In this example, the compute components 110 implement the XR engine 120, the input option engine 122, the context management engine 123, the image processing engine 124, and the rendering engine 126. In other examples, the compute components 110 can also implement one or more other processing engines.

The image sensor 102 can include any image and/or video sensors or capturing devices. In some examples, the image sensor 102 can be part of a multiple-camera assembly, such as a dual-camera assembly, a three-camera assembly, a four-camera assembly, or other number of cameras. In some examples, the image sensor 102 can include any combination of one or more visible light cameras (e.g., configured to capture monochrome or color images, such as red-green-blue or RGB images), one or more infrared (IR) cameras and/or near-infrared (NIR) cameras, one or more depth sensors, and/or other type of image sensor(s) or camera(s).

The image sensor 102 can capture image and/or video content (e.g., raw image and/or video data), which can then be processed by the compute components 110, the XR engine 120, the input option engine 122, the context management engine 123, the image processing engine 124, and/or the rendering engine 126 as described herein. For instance, the image sensor 102 can capture image data and can generate frames based on the image data and/or can provide the image data or frames to the compute components 110, the XR engine 120, the input option engine 122, the context management engine 123, the image processing engine 124, and/or the rendering engine 126 for processing. A frame can include a video frame of a video sequence or a still image. A frame can include a pixel array representing a scene. For example, a frame can be a red-green-blue (RGB) frame having red, green, and blue color components per pixel; a luma, chroma-red, chroma-blue (YCbCr) frame having a luma component and two chroma (color) components (chroma-red and chroma-blue) per pixel; or any other suitable type of color or monochrome picture.

In some cases, the image sensor 102 (and/or other camera of the XR system 100) can be configured to also capture depth information. For example, in some implementations, the image sensor 102 (and/or other camera) can include an RGB-depth (RGB-D) camera. In some examples, the XR system 100 can include one or more depth sensors (not shown) that are separate from the image sensor 102 (and/or other camera) and that can capture depth information. For instance, such a depth sensor can obtain depth information independently from the image sensor 102. In some examples, a depth sensor can be physically installed in the same general location as the image sensor 102, but may operate at a different frequency or frame rate from the image sensor 102. In some examples, a depth sensor can take the form of a light source that can project a structured or textured light pattern, which may include one or more narrow bands of light, onto one or more objects in a scene. Depth information can then be obtained by exploiting geometrical distortions of the projected pattern caused by the surface shape of the object. In one example, depth information may be obtained from stereo sensors such as a combination of an infra-red structured light projector and an infra-red camera registered to a camera (e.g., an RGB camera).

The XR system 100 also includes one or more sensors other than the image sensor 102. The one or more sensors can include one or more accelerometers (e.g., accelerometer 104), one or more gyroscopes (e.g., gyroscope 106), and/or other sensors. The one or more sensors can provide velocity, orientation, and/or other position-related information to the compute components 110. For example, the accelerometer 104 can detect acceleration by the XR system 100 and can generate acceleration measurements based on the detected acceleration. In some cases, the accelerometer 104 can provide one or more translational vectors (e.g., up/down, left/right, forward/back) that can be used for determining a position or pose of the XR system 100. The gyroscope 106 can detect and measure the orientation and angular velocity of the XR system 100. For example, the gyroscope 106 can be used to measure the pitch, roll, and yaw of the XR system 100. In some cases, the gyroscope 106 can provide one or more rotational vectors (e.g., pitch, yaw, roll). In some examples, the image sensor 102 and/or the XR engine 120 can use measurements obtained by the accelerometer 104 (e.g., one or more translational vectors) and/or the gyroscope 106 (e.g., one or more rotational vectors) to calculate the pose of the XR system 100. As previously noted, in other examples, the XR system 100 can also include other sensors, such as an inertial measurement unit (IMU), a magnetometer, a gaze and/or eye tracking sensor (e.g., an eye tracking camera), a machine vision sensor, a smart scene sensor, a speech recognition sensor, an impact sensor, a shock sensor, a position sensor, a tilt sensor, etc.

In some cases, the one or more sensors can include at least one IMU. An IMU is an electronic device that measures the specific force, angular rate, and/or the orientation of the XR system 100, using a combination of one or more accelerometers, one or more gyroscopes, and/or one or more magnetometers. In some examples, the one or more sensors can output measured information associated with the capture of an image captured by the image sensor 102 (and/or other camera of the XR system 100) and/or depth information obtained using one or more depth sensors of the XR system 100.

The output of one or more sensors (e.g., the accelerometer 104, the gyroscope 106, one or more other type of IMU, and/or other sensors) can be used by the extended reality engine 120 to determine a pose of the XR system 100 (also referred to as the head pose) and/or the pose of the image sensor 102 (or other camera of the XR system 100). In some cases, the pose of the XR system 100 and the pose of the image sensor 102 (or other camera) can be the same. The pose of image sensor 102 refers to the position and orientation of the image sensor 102 relative to a frame of reference (e.g., with respect to the object 202). In some implementations, the camera pose can be determined for 6-Degrees Of Freedom (6DOF), which refers to three translational components (e.g., which can be given by X (horizontal), Y (vertical), and Z (depth) coordinates relative to a frame of reference, such as the image plane) and three angular components (e.g. roll, pitch, and yaw relative to the same frame of reference).

In some cases, a device tracker (not shown) can use the measurements from the one or more sensors and image data from the image sensor 102 to track a pose (e.g., a 6DOF pose) of the XR system 100. For example, the device tracker can fuse visual data (e.g., using a visual tracking solution) from the image data with inertial data from the measurements to determine a position and motion of the XR system 100 relative to the physical world (e.g., the scene) and a map of the physical world. As described below, in some examples, when tracking the pose of the XR system 100, the device tracker can generate a three-dimensional (3D) map of the scene (e.g., the real world) and/or generate updates for a 3D map of the scene. The 3D map updates can include, for example and without limitation, new or updated features and/or feature or landmark points associated with the scene and/or the 3D map of the scene, localization updates identifying or updating a position of the XR system 100 within the scene and the 3D map of the scene, etc. The 3D map can provide a digital representation of a scene in the real/physical world. In some examples, the 3D map can anchor location-based objects and/or content to real-world coordinates and/or objects. The XR system 100 can use a mapped scene (e.g., a scene in the physical world represented by, and/or associated with, a 3D map) to merge the physical and virtual worlds and/or merge virtual content or objects with the physical environment.

In some aspects, the pose of image sensor 102 and/or the XR system 100 as a whole can be determined and/or tracked by the compute components 110 using a visual tracking solution based on images captured by the image sensor 102 (and/or other camera of the XR system 100). For instance, in some examples, the compute components 110 can perform tracking using computer vision-based tracking, model-based tracking, and/or simultaneous localization and mapping (SLAM) techniques. For instance, the compute components 110 can perform SLAM or can be in communication (wired or wireless) with a SLAM engine (not shown). SLAM refers to a class of techniques where a map of an environment (e.g., a map of an environment being modeled by XR system 100) is created while simultaneously tracking the pose of a camera (e.g., image sensor 102) and/or the XR system 100 relative to that map. The map can be referred to as a SLAM map, and can be three-dimensional (3D). The SLAM techniques can be performed using color or grayscale image data captured by the image sensor 102 (and/or other camera of the XR system 100), and can be used to generate estimates of 6DOF pose measurements of the image sensor 102 and/or the XR system 100. Such a SLAM technique configured to perform 6DOF tracking can be referred to as 6DOF SLAM. In some cases, the output of the one or more sensors (e.g., the accelerometer 104, the gyroscope 106, one or more IMUs, and/or other sensors) can be used to estimate, correct, and/or otherwise adjust the estimated pose.

In some cases, the 6DOF SLAM (e.g., 6DOF tracking) can associate features observed from certain input images from the image sensor 102 (and/or other camera) to the SLAM map. For example, 6DOF SLAM can use feature point associations from an input image to determine the pose (position and orientation) of the image sensor 102 and/or XR system 100 for the input image. 6DOF mapping can also be performed to update the SLAM map. In some cases, the SLAM map maintained using the 6DOF SLAM can contain 3D feature points triangulated from two or more images. For example, key frames can be selected from input images or a video stream to represent an observed scene. For every key frame, a respective 6DOF camera pose associated with the image can be determined. The pose of the image sensor 102 and/or the XR system 100 can be determined by projecting features from the 3D SLAM map into an image or video frame and updating the camera pose from verified 2D-3D correspondences.

In one illustrative example, the compute components 110 can extract feature points from every input image or from each key frame. A feature point (also referred to as a registration point) as used herein is a distinctive or identifiable part of an image, such as a part of a hand, an edge of a table, among others. Features extracted from a captured image can represent distinct feature points along three-dimensional space (e.g., coordinates on X, Y, and Z-axes), and every feature point can have an associated feature location. The feature points in key frames either match (are the same or correspond to) or fail to match the feature points of previously-captured input images or key frames. Feature detection can be used to detect the feature points. Feature detection can include an image processing operation used to examine one or more pixels of an image to determine whether a feature exists at a particular pixel. Feature detection can be used to process an entire captured image or certain portions of an image. For each image or key frame, once features have been detected, a local image patch around the feature can be extracted. Features may be extracted using any suitable technique, such as Scale Invariant Feature Transform (SIFT) (which localizes features and generates their descriptions), Speed Up Robust Features (SURF), Gradient Location-Orientation histogram (GLOH), Normalized Cross Correlation (NCC), or other suitable technique.

In some cases, the XR system 100 can also track the hand and/or fingers of the user to allow the user to interact with and/or control virtual content in a virtual environment (e.g., virtual content displayed in a virtual private space). For example, the XR system 100 can track a pose and/or movement of the hand and/or fingertips of the user to identify or translate user interactions with the virtual environment. The user interactions can include, for example and without limitation, moving an item of virtual content, resizing the item of virtual content and/or a location of the virtual private space, selecting an input interface element in a virtual user interface (e.g., a virtual representation of a mobile phone, a virtual keyboard, and/or other virtual interface), providing an input through a virtual user interface, etc.

Figure 2:
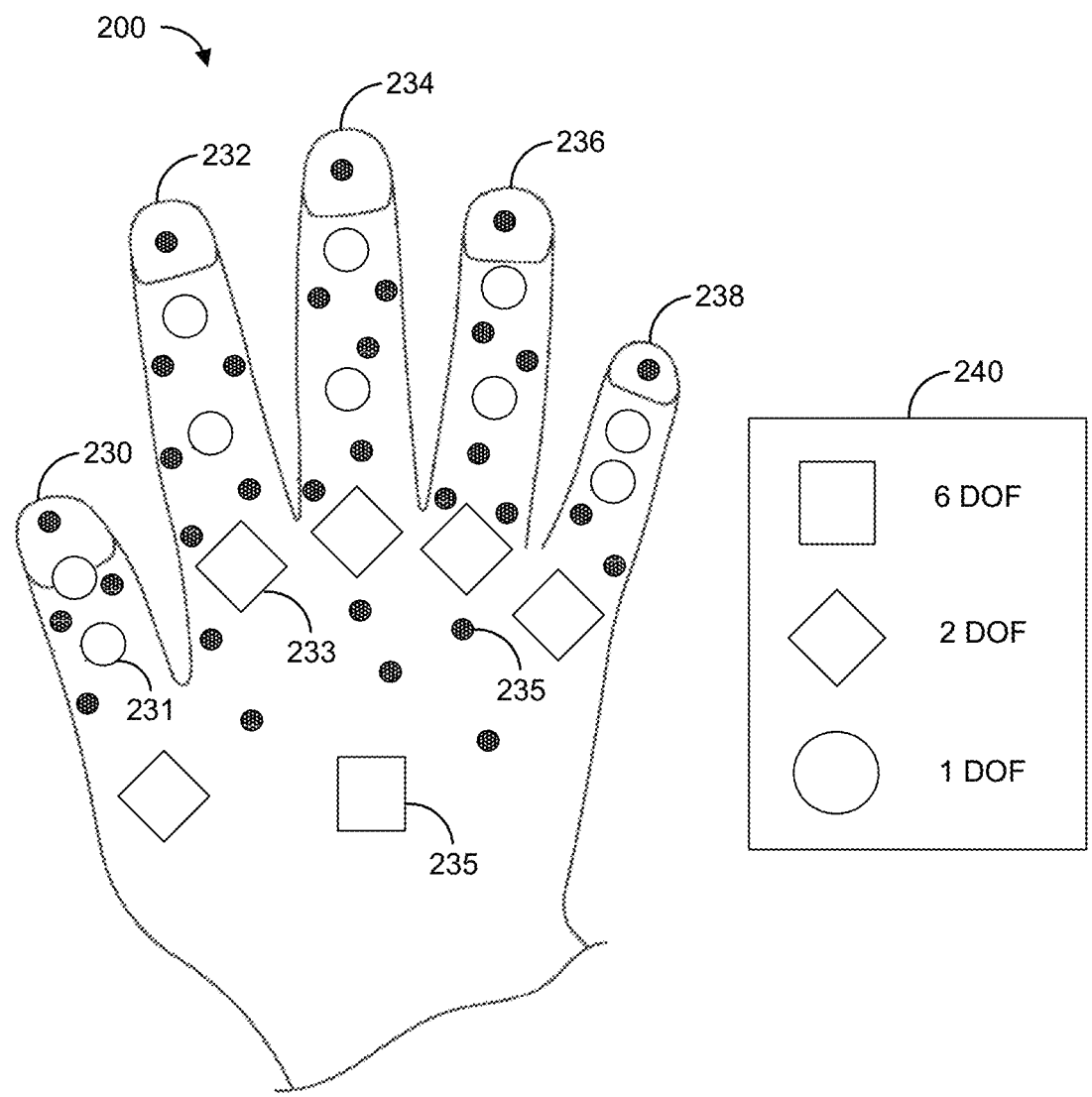
FIG. 2 is a diagram illustrating example landmark points of a hand that can be used to track positions of the hand and interactions by the hand with a virtual environment, in accordance with some examples of the present disclosure.

FIG. 2 is a diagram illustrating example landmark points of a hand 200 that can be used to track positions of the hand 200 and interactions by the hand 200 with a virtual environment, such as a virtual content displayed within a virtual private space as described herein. The landmark points shown in FIG. 2 correspond to different parts of the hand 200, including a landmark point 235 on the palm of the hand 200, landmark points on the thumb 230 of the hand 200, landmark points on the index finger 232 of the hand 200, landmark points on the middle finger 234 of the hand 200, landmark points on the ring finger 236 of the hand 200, and landmark points on the pinky finger 238 of the hand 200. The palm of the hand 200 can move in three translational directions (e.g., measured in X, Y, and Z directions relative to a plane, such as an image plane) and in three rotational directions (e.g., measured in yaw, pitch, and roll relative to the plane), and thus provides six degrees of freedom (6DOF) that can be used for registration and/or tracking. The 6DOF movement of the palm is illustrated as a square in FIG. 2, as indicated in the legend 240.

The different joints of the fingers of the hand 200 allow for different degrees of movement, as illustrated in the legend 240. As illustrated by the diamond shapes (e.g., diamond 233) in FIG. 2, the base of each finger (corresponding to the metacarpophalangeal joint (MCP) between the proximal phalanx and the metacarpal) has two degrees of freedom (2DOF) corresponding to flexion and extension as well as abduction and adduction. As illustrated by the circle shapes (e.g., circle 231) in FIG. 2, each of the upper joints of each finger (corresponding to the interphalangeal joints between the distal, middle, and proximal phalanges) has one degree of freedom (1DOF) corresponding flexion and extension. As a result, the hand 200 provides 26 degrees of freedom (26DOF) from which to track the hand 200 and interactions by the hand 200 with virtual content rendered by the XR system 100.

The XR system 100 can use one or more of the landmark points on the hand 200 to track the hand 200 (e.g., track a pose and/or movement of the hand 200) and track interactions with a virtual environment rendered by the XR system 100. As noted above, as a result of the detection of the one or more landmark points on the hand 200, the pose of the landmarks (and thus the hand and fingers) in relative physical position with respect to the XR system 100 can be established. For example, the landmark points on the palms of the hand 200 (e.g., the landmark point 235) can be detected in an image, and the locations of the landmark points can be determined with respect to the image sensor 102 of the XR system 100. A point of an item of virtual content (e.g., a center point, such as a center of mass or other center point) rendered by the XR system 100 can be translated to a position on a display (or a rendering on the display) of the XR system 100 (e.g., the display 109 of FIG. 1) relative to the locations determined for the landmark points on the palms of the hand 200.

As described below, the XR system 100 can also register the virtual content and/or the hand 200 to points in the real world (as detected in one or more images) and/or to other parts of the user. For instance, in some implementations, in addition to determining a physical pose of the hand 200 with respect to the XR system 100 (or XR system 100) and/or an item of virtual content, the XR system 100 can determine the location of other landmarks, such as distinctive points (referred to as feature points) on walls, one or more corners of objects, features on a floor, points on a human face, points on nearby devices, among others. In some cases, the XR system 100 can place the virtual content within a certain position with respect to feature points detected in the environment, which can correspond to, for example, detected objects and/or humans in the environment.

In some examples, the pose of the XR system 100 (and/or the head of the user) can be determined using, for example, image data from the image sensor 102 and/or measurements from one or more sensors such as the accelerometer 104, the gyroscope 106, and/or one or more other sensors (e.g., one or more magnetometers, one or more inertial measurement units (IMUs), etc.). The head pose can be used to determine a position of the virtual content, the hand 200, and/or objects and/or humans in the environment.

The operations for the XR engine 120, the input option engine 122, the context management engine 123, the image processing engine 124, and the rendering engine 126 (and any image processing engines) can be implemented by any of the compute components 110. In one illustrative example, the operations of the rendering engine 126 can be implemented by the GPU 114, and the operations of the XR engine 120, the input option engine 122, the context management engine 123, and the image processing engine 124 can be implemented by the CPU 112, the DSP 116, and/or the ISP 118. In some cases, the compute components 110 can include other electronic circuits or hardware, computer software, firmware, or any combination thereof, to perform any of the various operations described herein.

In some examples, the XR engine 120 can perform XR operations to generate an XR experience based on data from the image sensor 102, the accelerometer 104, the gyroscope 106, and/or one or more sensors on the XR system 100, such as one or more IMUs, radars, etc. In some examples, the XR engine 120 can perform tracking, localization, pose estimation, mapping, content anchoring operations and/or any other XR operations/functionalities. An XR experience can include use of the XR system 100 to present XR content (e.g., virtual reality content, augmented reality content, mixed reality content, etc.) to a user during a virtual session. In some examples, the XR content and experience can be provided by the XR system 100 through an XR application (e.g., executed or implemented by the XR engine 120) that provides a specific XR experience such as, for example, an XR gaming experience, an XR classroom experience, an XR shopping experience, an XR entertainment experience, an XR activity (e.g., an operation, a troubleshooting activity, etc.), among others. During the XR experience, the user can view and/or interact with virtual content using the XR system 100. In some cases, the user can view and/or interact with the virtual content while also being able to view and/or interact with the physical environment around the user, allowing the user to have an immersive experience between the physical environment and virtual content mixed or integrated with the physical environment.

The XR engine 120, the input option engine 122, and the context management engine 123 can perform various operations to determine (and manage) how, where, and/or when to render certain virtual content with respect to one or more other devices. For instance, the XR engine 120, the input option engine 122, and the context management engine 123 can facilitate interactions with other devices, such as, for example, connected devices (e.g., network-connected cameras, speakers, lightbulbs, hubs, locks, plugs, thermostats, displays, alarm systems, televisions (TVs), gadgets, appliances, etc.), mobile devices, devices that lack outward/external controls, devices that lack a display and/or user interface, devices that have certain characteristics that present one or more challenges (e.g., devices that have controls/interfaces in a language that is not understood by the user, controls/interfaces that are not recognized/understood by the user, limited accessibility options, input options that are not readily recognized/understood by the user, etc.) to a user wishing to interact with such devices, devices that have controls/interfaces that are out of reach to the user, and/or any other devices. For example, the input option engine 122 can obtain or receive input data indicating or identifying one or more input options of another device. The input option engine 122 can send the input data to the XR engine 120. The context management engine 123 can obtain or receive information (e.g., context information, etc.) related to the other device (which the user can interact with using the XR system 100), a scene or environment in which the XR system and/or the other device are located, the user of the XR system attempting to interact with the other device, and/or other context. The context management engine 123 can send the context information to the XR engine 120.

Using the input data indicating the one or more input options for the device and/or using the context information, the XR engine 120 can cause the rendering engine 126 to present relevant information to a user. For example, the XR engine 120 can cause the rendering engine 126 to output guidance data corresponding to an input option for which relevant context information has been determined. The guidance data can inform the user what input options are available for the other device, how to provide such inputs, etc. In some examples, the guidance data can filter out input options (and/or associated information) that may be less relevant or unavailable given the current context (e.g., in view of the information relevant to the XR system 100, the scene, the other device, and/or the user associated with the XR system 100). In some examples, using the input data indicating the one or more input options for the device and/or using the context information, the XR engine 120 can cause the rendering engine 126 to present a user interface and/or input options for interacting with (e.g., controlling, accessing content, accessing status information, accessing outputs, etc.) the device.

For instance, based on the context information and the input data identifying the input options associated with the other device, the XR engine 120 can cause the rendering engine 126 to present user interaction data corresponding to one or more input options that enable user interactions with the other device. For instance, the user interaction data can include one or more user interface elements (e.g., a selectable control option, etc.) associated with an input option, a cue (e.g., a highlight, an arrow, text, etc.) indicating how to provide an input associated with the input option, and/or other data. The context information can enable the XR engine 120 to present content (e.g., virtual content, audio content, user interface content, etc.) that is contextually appropriate given the situation/context associated with the user, the XR system 100, the other device, the scene, and/or that otherwise facilitates interactions with the other devices. In some cases, the XR engine 120 can cause the rendering engine 126 to present no content or to reduce or filter an amount of virtual content to display based on the context (e.g., to display a subset of user interface options).

In some cases, the XR engine 120 can leverage its XR capabilities to facilitate interactions with other devices. For example, the XR system 100 may have AR capabilities, such as an ability to display virtual content on a display of the XR system 100 while also allowing a user to view the real-world environment through the display. The XR engine 120 can leverage the AR capabilities to render a user interface for the user to interact with the other device directly or by providing input to the XR engine 120 (e.g., using the input device 108). For instance, the rendering engine 126 can render the user interface on a display so that the user interface appears to the user as an overlay on the other device or a portion of the other device (e.g., a control, a surface, a display, a panel, etc.) to facilitate user interactions with the other device. The interactions with the overlaid user interface can be used by the XR engine 120 (or other component of the XR system 100) to control the other device based on user inputs and/or access data/outputs from the other device. In some cases, to facilitate and/or improve user interactions with other devices, an XR system 100 may localize and/or map the other device. For example, the XR system 100 can localize another device and use the localization information to render a user interface overlaid on the other device or a portion of the other device.

The XR system 100 can register or anchor items of virtual content to (e.g., positioned relative to) the detected feature points in a scene. For example, the input option engine 122, the context management engine 123, and/or the image processing engine 124 can coordinate with the XR engine 120 and/or the rendering engine 126 to anchor the virtual content of a user interface to the feature points of the surface on which the virtual content will be displayed.

In some examples, the XR system 100 can communicate with one or more other devices to provide inputs/commands to the other device based on user interactions with the user interface rendered by the rendering engine 126. For example, the XR engine 120 can cause the XR system 100 to send (using a transmitter or transceiver) a command to a device based on user input received via the rendered user interface and/or input options. The command can cause the device to perform one or more functions based on the user input.

In other examples, the XR engine 120 can leverage one or more interaction modes (e.g., visual, voice/audio, gesture-based, motion-based, etc.) to facilitate user interactions with the other device. For example, the XR engine 120 can use hand tracking and/or gesture recognition capabilities to allow a user to use gestures and other interactions to interact with (e.g., control, access, etc.) other devices. As another example, the XR engine 120 can use speech recognition to allow a user to use voice commands to interact with other devices.

As noted above, the input data can indicate some or all input options that can be used to interact with the other device. For example, the input options can include types of input supported by the device (e.g., gesture based, voice based, touch based, etc.), functionality the device can perform based on particular inputs (e.g., a swipe to the right can cause a thermostat to increase the temperature, etc.), among other information.

In some examples, the input option engine 122 can obtain or receive the input data indicating one or more input options of another device from the other device, from a server (e.g., a cloud-based server involved with operation of the other device), and/or from another source. For instance, the input option engine 122 can send (or cause a transmitter or transceiver to send) a request for input options to the device. In one example, the XR system 100 can detect or sense the device, such as based on a previous network pairing with the device, based on a periodic beacon signal transmitted (e.g., broadcast) by the device indicating its presence, based on detecting the device in one or more images provided by the image sensor 102, etc. In response to detecting or sensing the device, the XR system 100 can request the input data from the device. In response to the request, the device can respond with input data indicating any input options that are associated with the device. In another example, the input option engine 122 can request input options for a given device from a server associated with the device (e.g., a Google™ server associated with a Google Home™ device). The server can respond with input data indicating the input options associated with the device.

In some cases, the input option engine 122 can determine one or more input options of the other device by processing one or more images of the other device captured by the image sensor 102. For instance, using an elevator control panel as an illustrative example of a user interface of a device (the elevator), the input option engine 122 can receive images of the elevator control panel from the image sensor 102. Using machine learning (e.g., using one or more neural network-based object detectors or classifiers), computer vision (e.g., using a computer-vision based object detector or classifier), or other image analysis techniques, the input option engine 122 can determine that the control panel includes fifteen numbers corresponding to floors of a building, a door-open button, a door-close button, an emergency button, and/or other physical or virtual buttons.

In some examples, if a device does not communicate any input data to the XR system (e.g., after the XR system sends a request to the device), the XR system can determine or infer that the device does not have an ability to communicate with the XR system (e.g., over a wireless network). In such examples, the XR system can present instructions or other information (e.g., highlighted a particular button on the device) to help the user determine how to interact with the device. For instance, in the elevator example above, the elevator may not have the ability to communicate with the XR system (e.g., over a communications network). In such an example, the XR system can present virtual content that helps the user interact with the elevator, instead of sending one or more commands to control the elevator based on received user input.

The context management engine 123 can send the context information to the XR engine 120. The context information provides the XR engine 120 with contextual awareness of the situation/context associated with the user, the XR system 100, the other device(s), the scene, etc. The XR engine 120 can use the context information to manage, modulate, and/or determine the content, input options, user interface, and/or modalities to present to the user for interacting with the other devices. For instance, as noted above, the context information can be used by the XR engine 120 to present content (e.g., virtual content, audio content, user interface content, etc.) that is contextually related to the situation/context associated with the user, the XR system 100, the other device, the scene, and/or that otherwise facilitates interactions with the other devices.

The context information can be related to the other device (which the user can interact with using the XR system 100), a scene or environment in which the XR system 100 and/or the other device are located, the user of the XR system 100 attempting to interact with the other device, and/or other context at any given point in time. In some examples, the context information can include an intended interaction of the user with the other device, such as an intention to interact with the device, an intention to interact with a particular input option of a user interface of the device (e.g., a particular user interface control element), and/or other intended user interaction. The context management engine 123 can estimate the intended user interaction, such as based on eye gaze, a particular gesture being performed, the user holding the other device, the user walking toward the device, and/or other information. For instance, the context management engine 123 can determine the user is gazing at a thermostat, and based on the determined gaze, determine that the user intends to interact with the thermostat. In another example, the context information can include one or more actions of the user in the scene. For instance, the one or more actions can include the user walking towards the device, walking toward a door in the scene, sitting down in a chair from which the user typically watches television, among others. Other examples of context information include characteristics associated with the user (e.g., vision quality, spoken language(s), etc.), historical information associated with the user and the other device (e.g., past use of the device by the user, the user's experience level with the device or similar device, etc.), a user interface capability of the other device (e.g., whether it has outward/external controls that are visible or otherwise accessible to a user), information associated with the other device (e.g., how far the other device is from the XR system 100), information associated with the scene (e.g., lighting, noise level such as ambient sound, objects or other obstacles between the XR system 100 and the device, whether there are any other users in the scene, etc.), and/or other information.

In some examples, the context management engine 123 can determine, obtain, or receive the context information locally. For example, the context management engine 123 can obtain sensor information from one or more sensors of the XR system 100 (e.g., the image sensor 102, the accelerometer 104, the gyroscope 106, and/or other sensor of the XR system 100). The context management engine 123 can process the sensor information to determine the context information, such as one or more intended interactions of the user with the other device, one or more actions of the user in the scene, a user interface capability of the other device, information associated with the other device (e.g., a distance of the device from the XR system 100 and thus the user), information associated with the scene (e.g., lighting, noise, objects or obstacles between the XR system 100 and the device, etc.), and/or other contextual information. In one illustrative example, the context management engine 123 can receive images from the image sensor 102 that indicate the user is looking at an oven and can also receive sensor data from the accelerometer 104 and/or gyroscope 106 indicating that the user is walking towards the oven. Based on the images and the sensor data, the context management engine 123 can determine that the user is intending to interact with the oven.

In some examples, the context management engine 123 can obtain or receive the context information from one or more remote sources (e.g., a server, the cloud, the Internet, the other devices, one or more sensors, etc.). For example, the context management engine 123 can have access to a user profile stored on a network-based or cloud-based system associated with the user that indicates characteristics associated with the user (e.g., the user's vision quality, languages spoken by the user, etc.) and/or historical information associated with the user and the other device (e.g., the user's experience level with one or more devices, how long the user has owned the one or more devices, etc.). In some cases, the user profile can be stored locally on the XR system 100.

As noted above, the context information provides the XR engine 120 with contextual awareness so that the XR system 100 can present content that is contextually related to a particular situation in which the XR system 100 is being used. For instance, when determining which AR content to present to the user to guide and/or assist user interactions with other devices and/or how to present the AR content, the XR engine 120 can use context information including characteristics of the user, the other device, etc. In one example, the XR engine 120 can consider the language understood/spoken by the user to ensure that the AR content presented is in the language understood/spoken by the user. As another example, the XR engine 120 can tailor the user interface guidance to expectations regarding the user's knowledge of the device. In one illustrative example, if the user is estimated to be a novice in using a device (e.g., based on an amount of time the user has owned the device, the number of times the user has used the device, and/or based on other factors), the XR engine 120 may output additional support for the user (e.g., by presenting instructions as to which inputs can be used to control the device). In another example, if the user is estimated to be an expert in using the device (e.g., the user is estimated to have at least a threshold amount of experience/familiarity), the XR engine 120 may not present additional support for the user or may reduce/minimize such support. As another example, if the user is wearing one or more items that could impact interactions with the other device, the XR engine 120 may adjust which user interface, controls, and/or guidance are output to the user in view of what the user is wearing. In one illustrative example, the XR engine 120 can adjust the user interface, controls, and/or guidance it provides if the user is wearing gloves that may impede the user's ability to select/touch controls, if the user is wearing glasses (or is not wearing glasses) or sunglasses that could impede viewability, if the user has a medical device restricting the user's movement and ability to interact with certain controls, etc.

As another example, the XR engine 120 can use context information associated with the scene (e.g., environmental factors) when determining how to present AR content and/or what AR content to present to the user. For example, the XR engine 120 can consider the lighting conditions such as poor lighting or bright light conditions (e.g., which may suggest using audio cues and/or visual cues), ambient sound (e.g., which may suggest using visual cues over audio cues), a presence of other people (e.g., which may suggest a need to be discreet or private, such as not providing any audio output, not presenting input options that include hand or gesture motions, etc.), etc.

In some examples, the XR engine 120 can determine which of multiple devices with the user intends to interact. In some cases, the XR engine 120 can cause the rendering engine 126 to present a user interface to allow the user to interact with the specific device that the user intends to interact with. In some cases, the XR engine 120 can output guidance (e.g., as visual content or audio content) on how to interact with and/or control particular device. For example, in a kitchen with a smart home assistant playing music, a connected refrigerator, and a connected stove, a user may be interested in changing the temperature of the stove. Based on the context information received from the context management engine 123, the XR engine 120 can determine that the user intends to interact with the connected stove as opposed to the smart home assistant or the connected refrigerator. For example, based on the context information, the XR engine 120 can determine a user's eye gaze, pose, and/or movement and determine that the user intends to interact with the connected stove as opposed to the smart home assistant or the connected refrigerator. In some examples, the XR engine 120 can determine a number of possible gestures that the user can perform to interact with the connected stove. For instance, the XR engine 120 can determine that the user can change the temperature of the stove using a knob turning gesture. The XR engine 120 can provide an output informing the user (e.g., via a visual cue, an audio cue, etc.) that the user can change the temperature of the stove using a knob turning gesture. In some cases, the XR engine 120 can detect the knob turning gesture from the user and communicate an associated input to the connected stove. In some cases, the connected stove can directly detect the knob turning gesture.

The image processing engine 124 can perform one or more image processing operations related to virtual user interface content being presented. For instance, the image processing engine 124 can perform image processing operations based on data from the image sensor 102. In some cases, the image processing engine 124 can perform image processing operations such as, for example, filtering, demosaicing, scaling, color correction, color conversion, segmentation, noise reduction filtering, spatial filtering, artifact correction, etc. The rendering engine 126 can obtain image data generated and/or processed by the compute components 110, the image sensor 102, the XR engine 120, the input option engine 122, the context management engine 123, and/or the image processing engine 124, and can render video and/or image frames for presentation on a display device.

While the XR system 100 is shown to include certain components, one of ordinary skill will appreciate that the XR system 100 can include more or fewer components than those shown in FIG. 1. For example, the XR system 100 can also include, in some instances, one or more memory devices (e.g., RAM, ROM, cache, and/or the like), one or more networking interfaces (e.g., wired and/or wireless communications interfaces and the like), one or more display devices, and/or other hardware or processing devices that are not shown in FIG. 1. An illustrative example of a computing system and hardware components that can be implemented with the XR system 100 is described below with respect to FIG. 9.

Figure 3:
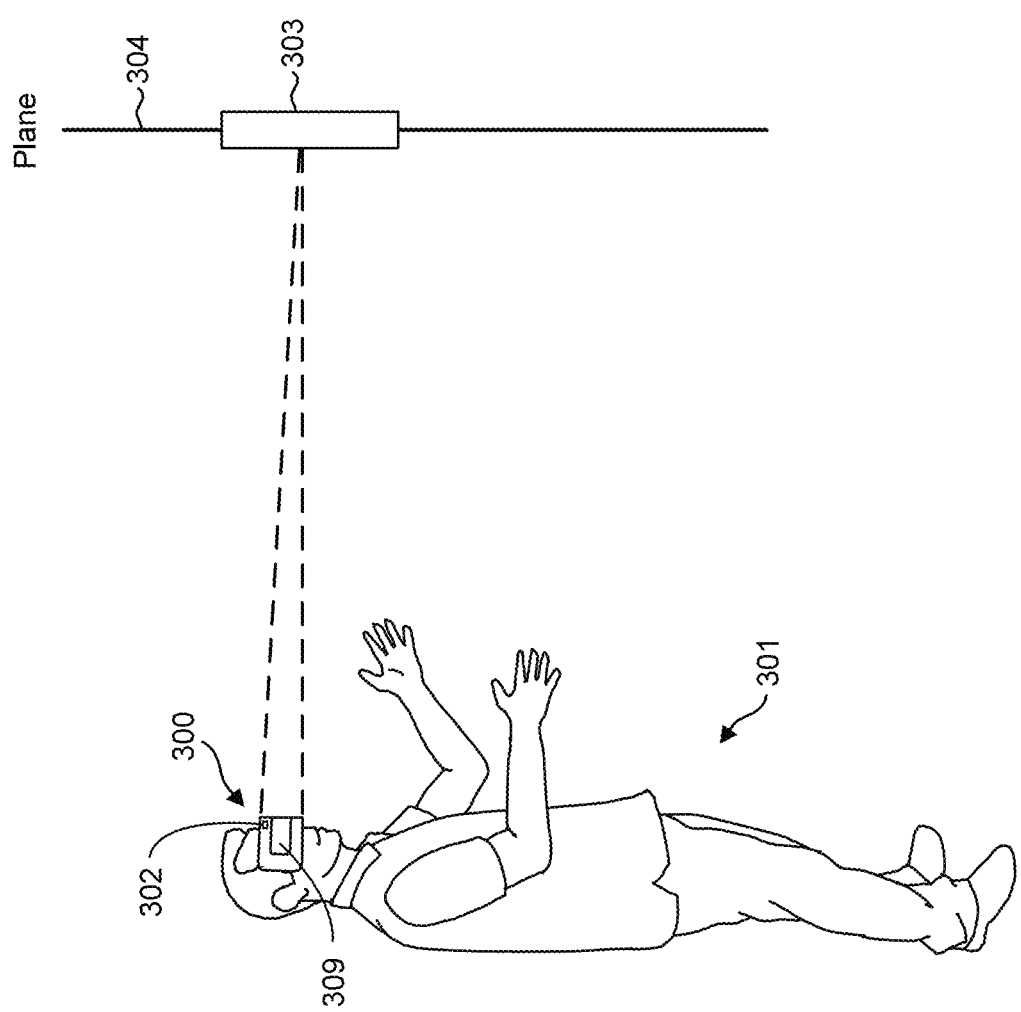
FIG. 3 is a diagram illustrating an example of an XR system being worn by a user, in accordance with some examples of the present disclosure.

FIG. 3 is a diagram illustrating an example of an extended reality system 300 being worn by a user 301. In some cases, the extended reality system 300 is similar to and can perform similar operations as the XR system 100 of FIG. 1. The extended reality system 300 can include any suitable type of XR device or system, such as AR or MR glasses, an AR, VR, or MR HMD, or other XR device. Some examples described below may be described using AR for illustrative purposes. However, the aspects described below can be applied to other types of XR, such as VR and MR. The extended reality system 300 shown in FIG. 3 can include an optical see-through AR device, which allows the user 301 to view the real world while wearing the extended reality system 300.

For example, the user 301 can view an object 303 in a real-world environment on a plane 304 at a distance from the user 301. As shown in FIG. 3, the extended reality system 300 has an image sensor 302 and a display 309. As described above, the display 309 can include a glass, a screen, a lens, and/or other display mechanism that allows the user 301 to see the real-world environment and also allows AR content to be displayed thereon. AR content (e.g., an image, a video, a graphic, a virtual or AR object, or other AR content) can be projected or otherwise displayed on the display 309. In one example, the AR content can include an augmented version of the object 303. In another example, the AR content can include additional AR content that is related to the object 303 and/or related to one or more other objects in the real-world environment. While one image sensor 302 and one display 309 are shown in FIG. 3, the extended reality system 300 can include multiple cameras and/or multiple displays (e.g., a display for the right eye and a display for the left eye) in some implementations.

Figure 4A:
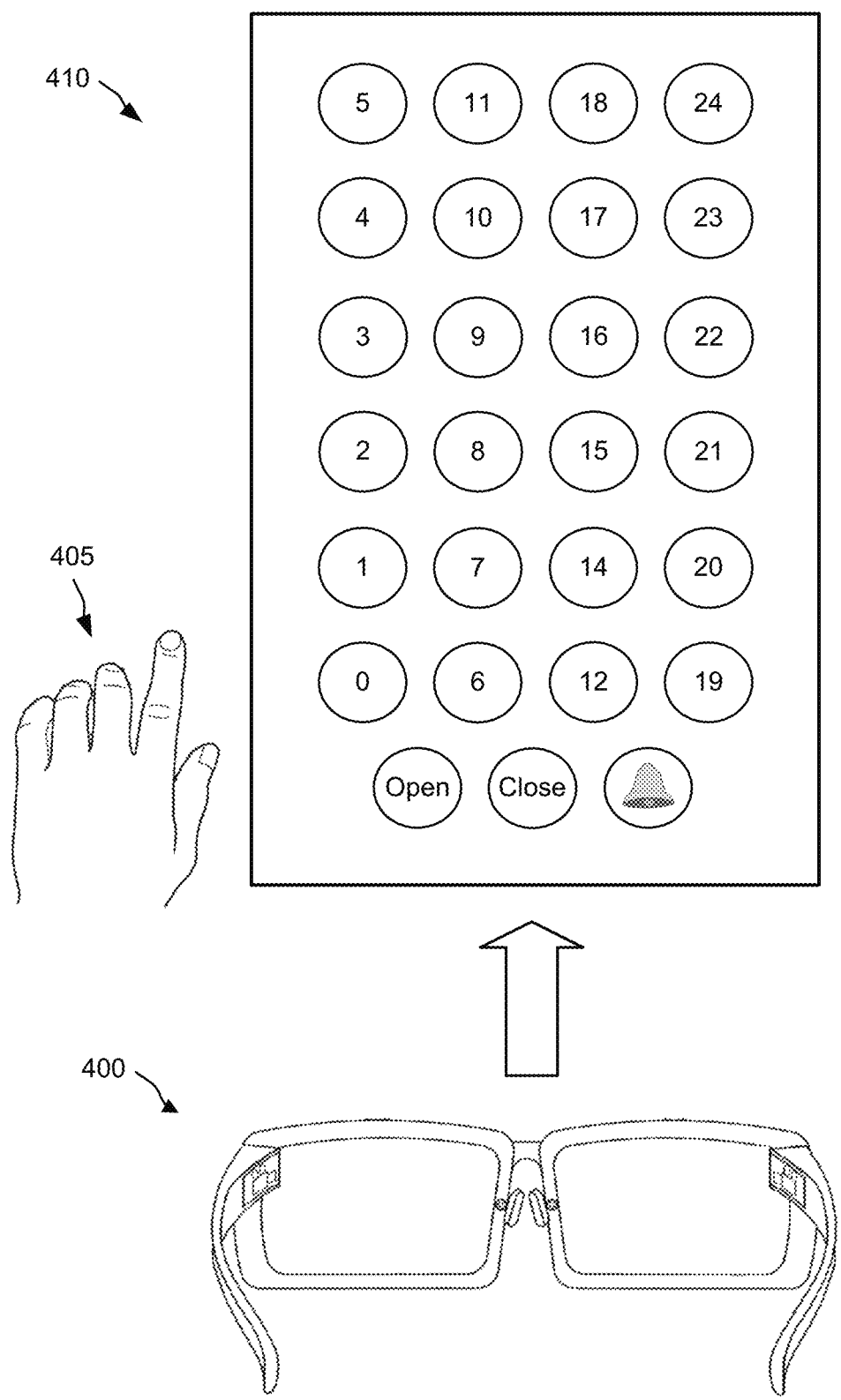
FIG. 4A, FIG. 4B, and FIG. 4C are diagrams illustrating an example of a user using an XR system to interact with a control panel of an elevator, in accordance with some examples of the present disclosure.
Figure 4B:
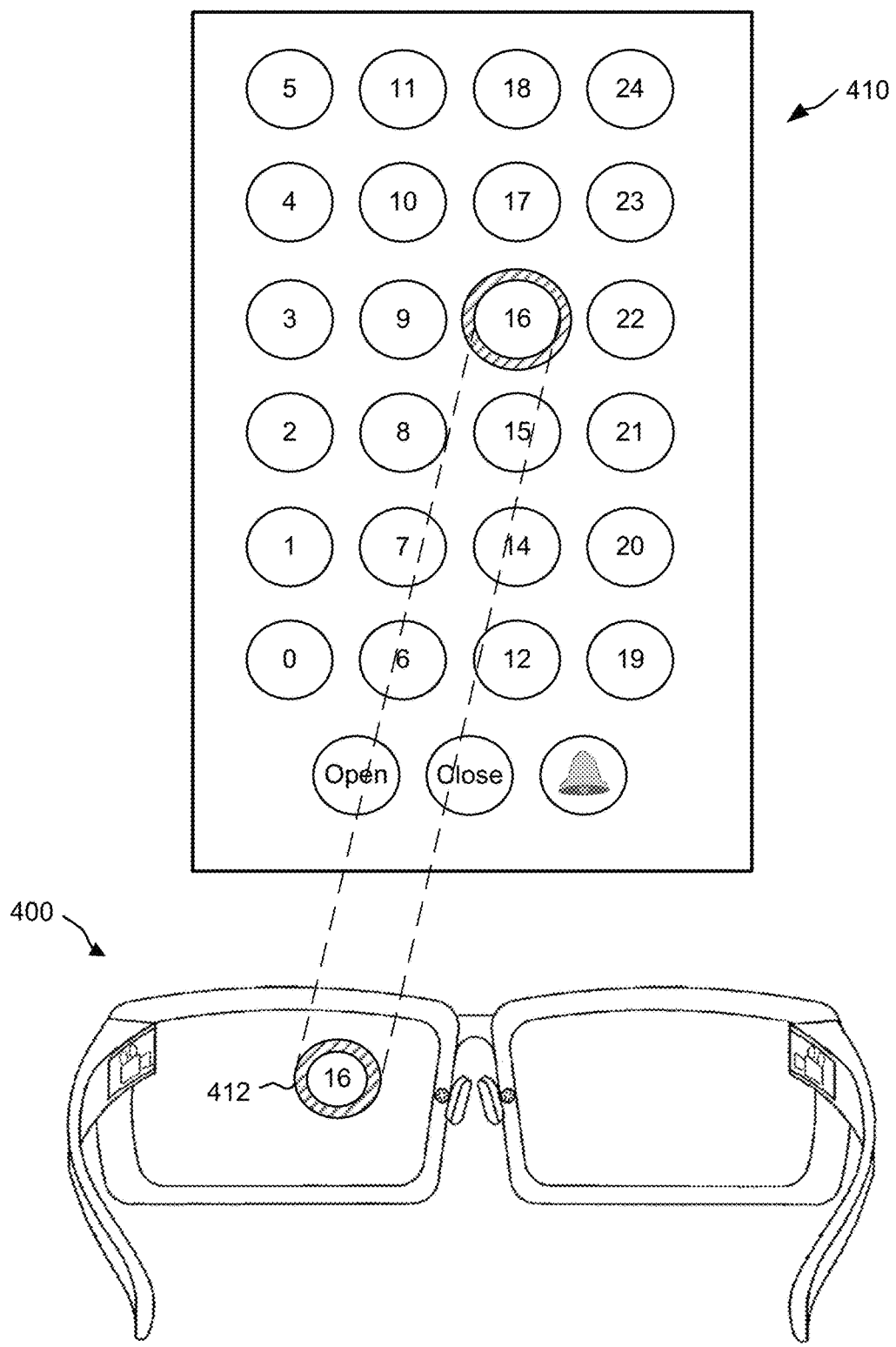
Figure 4C:
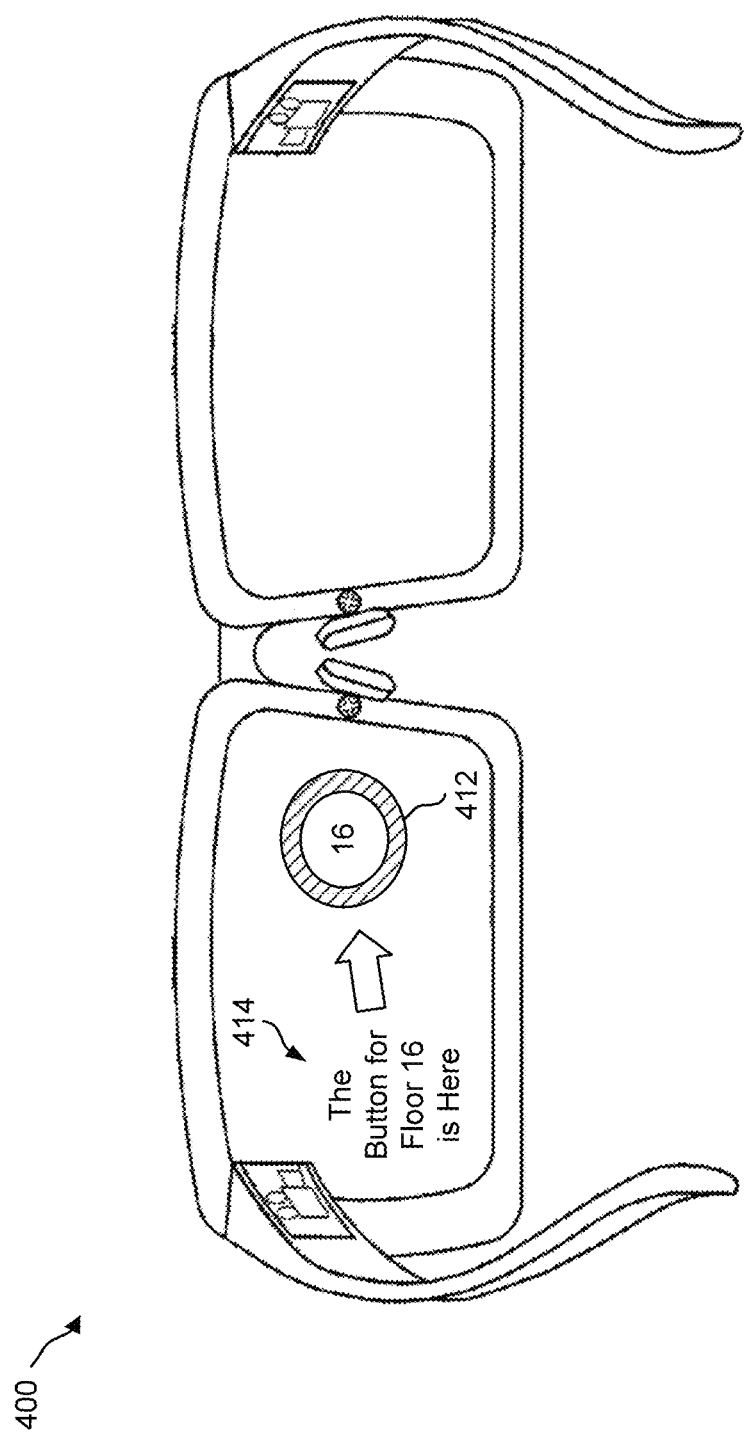

As described above with respect to FIG. 1, the XR engine 122 can utilize input data indicating one or more input options for a device and context data to cause the rendering engine 126 to present a user interface and/or input options for interacting with (e.g., controlling, accessing content, accessing status information, accessing outputs, etc.) the device. In one illustrative example, the XR system 100 can assist a user with interactions with a control panel, such as an elevator control panel, a control panel of a vehicle, etc. FIG. 4A, FIG. 4B, and FIG. 4C are diagrams illustrating an example of a user using an XR system 400 to interact with a control panel 410 of an elevator. For example, when the user wearing the XR system 400 enters an elevator, the XR system 400 can determine the user's eye gaze (e.g., via gaze scanning, based on an eye gaze camera, etc.) and/or one or more gestures, such as a gesture performed using a hand 405 of the user. Based on the eye gaze and/or gesture(s), the XR system 400 can determine that the user cannot find or is having difficulty finding the floor number to press on the elevator control panel 410. For instance, the XR system 400 can determine that the user's eye gaze is moving back and forth (as if the user is searching for the correct number).

The XR system 400 can determine that the user is searching for the control button associated with a specific floor, based on context information obtained by the XR system 400. For instance, the context information can include check-in information at a hotel (e.g., obtained by the XR system 400 from a server associated with the hotel), a voice command provided by the user to the XR system 400, a user preference/input (e.g., the user may enter the floor number into the XR system 100), recognized audio detected from the user (e.g., the XR system 400 recognizes the user saying the words "floor 16", such as using always-on audio), a detected room number (e.g., detected from one or more images captured by image sensor 102, etc.).

The XR system 400 can present a cue associated with the control button for the specific floor on the elevator control panel to guide the user to the correct button. For example, the XR system 400 can determine that the user is searching for the control button corresponding to floor 16 (associated with the button having the number "16" in FIG. 4A and FIG. 4B). As shown in FIG. 4B, the XR system 400 can display virtual content 412 highlighting the control button corresponding to floor 16. The virtual content 412 appears as if it is being overlaid over the actual control button corresponding to floor 16 to help the user readily identify the control button for which the user is searching. As shown in FIG. 4C, the XR system 400 can display the virtual content 412 highlighting the control button corresponding to floor 16 and can also present text 414 ("The Button for Floor 16 is Here") and an arrow icon providing further information to help the user identify the correct control button. While FIG. 4B and FIG. 4C show a highlight and text as example of visual cues, the cue can additionally or alternatively include other types of visual cues, an audio cue (e.g., to guide the user's hand based on hand tracking) indicating to the user an identification or location of the correct button, and/or other type of cue. This can be especially useful for a user with disabilities or a user that has difficulty remembering/learning the correct button.

In some cases, after multiple trips in the elevator, the XR system 400 can learn that the user can find the right button quickly and/or without help. In response, the XR system 400 can determine to stop providing virtual content to help identify the control button. In other cases, the XR system 400 can continue to provide such assistance to the user (e.g., when the contextual information with characteristics of the user indicate that the user has a disability). In some cases, the XR system 400 can similarly assist user interactions with other control panels, device, industrial machinery, etc.

Figure 5B:
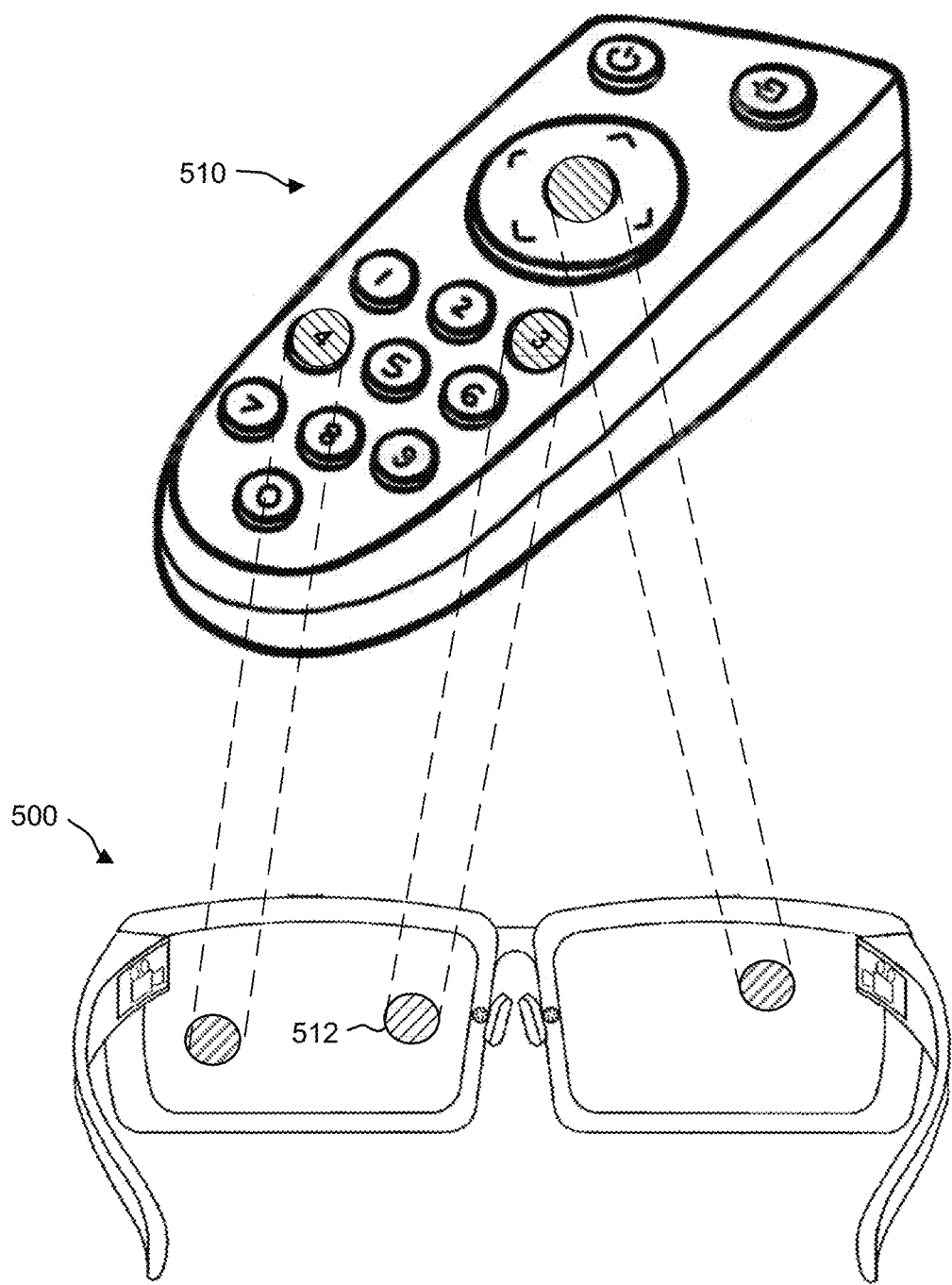

In another illustrative example, the XR system 100 can help a user interact with a remote control that can be used to control a device. FIG. 5A and FIG. 5B are diagrams illustrating an example of a user using an XR system 500 to interact with a remote control 510 that can control a television 511. The XR system 500 can determine that the user will likely have difficulty using the remote control 510 based on various factors. For instance, the XR system 500 can determine that the room in which the television 511 and the user are located has poor lighting conditions (e.g., based on one or more images of the room obtained using the image sensor 102, based on an ambient light sensor of the XR system 500, etc.). Further, based on context information obtained by the XR system 500 indicating characteristics of the user, the XR system 500 can determine that the user has poor near vision. The XR system 500 can additionally or alternatively determine that the labels or buttons on the remote control 510 are difficult to read, are in a language that the user does not understand, and/or otherwise make the remote control 510 difficult for the user to interact with. Based on this context information, the XR system 500 can determine that it is likely difficult for the user to see the controls/labels of the remote control 510. In some cases, the XR system 500 may additionally or alternatively detect that the user is having difficulty interacting with the remote control. For example, the XR system 500 can use eye tracking to determine that the user is squinting and/or scanning the remote control for the correct buttons.

The XR system 500 may obtain further context information indicating that the user intends to switch to a particular channel (channel 34) playing an event of interest to the user. For instance, the XR system 500 may determine that the user has scheduled a sport game on the user's digital calendar. In another example, the XR system 500 may determine that the user always watches a particular channel at a certain time of night. With the contextual knowledge that the remote control 510 is likely difficult to interact with and that the user intends to switch to the particular channel (e.g., because the user frequently watches the event in the particular channel at a current time), the XR system 500 can display virtual data 512 highlighting the correct "3" and "4" buttons on the remote control 510 to help the user identify the buttons and select the buttons to switch to the particular channel 34. In some examples, the XR system 500 can sequentially highlight the button "3" and then the button "4", so that the user knows to press button "3" prior to pressing button "4".

In some cases, in addition to or as an alternative to highlighting or otherwise emphasizing the numbers as described above, the XR system 500 can use audio to confirm the option (e.g., the event and/or associated button/channel) determined by the XR system 500. For example, the XR system 500 can provide an audio prompt asking the user to confirm that the user wishes to switch to the particular channel playing the event. The XR system 500 can receive a confirmation from the user (e.g., based on user input provided via an input device, such as input device 108) and continue with the assistance. In one example, in response to receiving the confirmation, the XR system 500 can highlight the correct buttons (e.g., the "3" and "4" buttons) on the remote control 510 that correspond to the channel (e.g., channel 34). In another example, in response to receiving the confirmation, the XR system 500 can automatically send a command to the television 511 and/or the remote control 510 that causes the television 511 to change to the channel (e.g., channel 34).

Figure 6A:
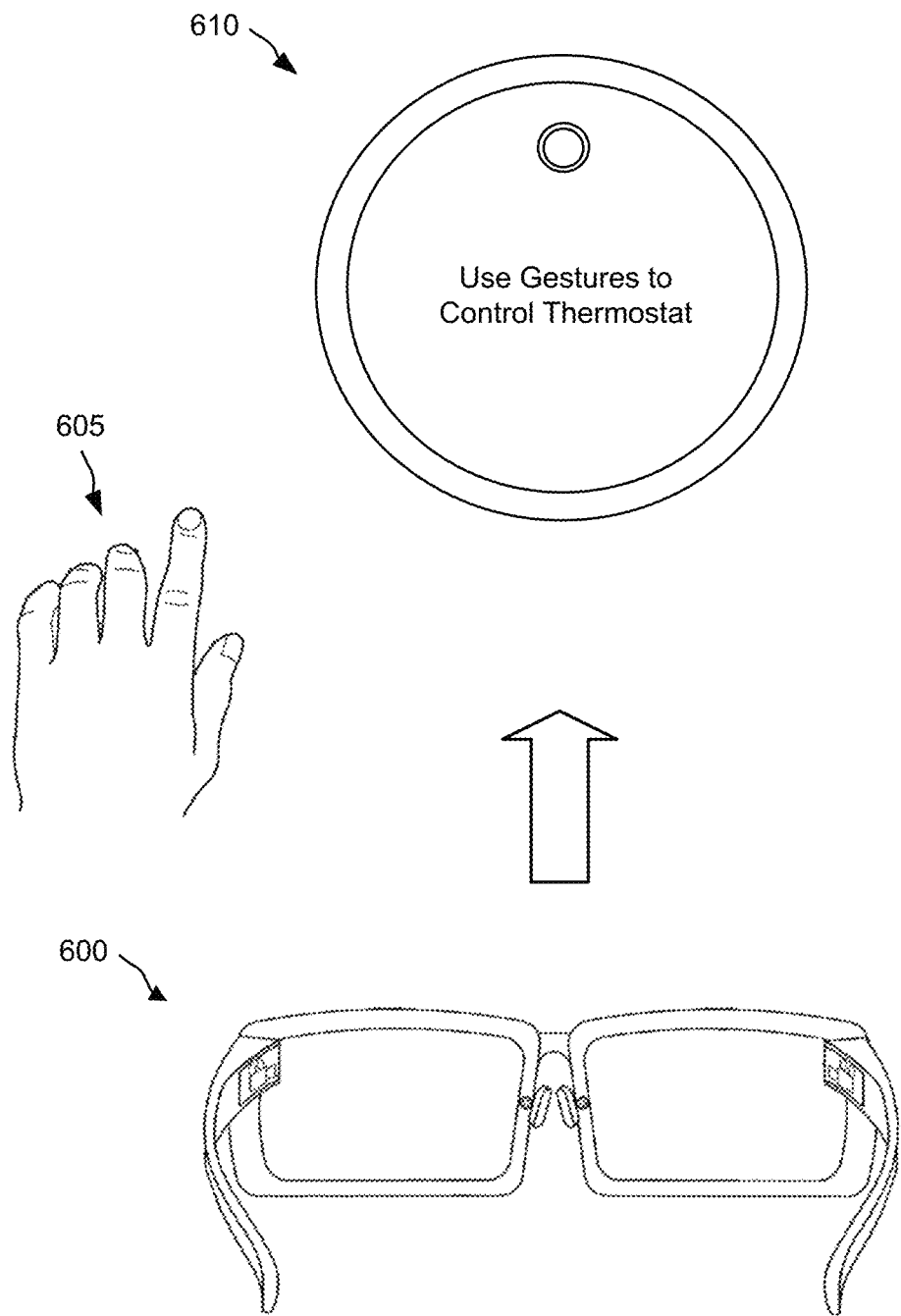
FIG. 6A and FIG. 6B are diagrams illustrating an example of a user using an XR system to interact with a thermostat, in accordance with some examples of the present disclosure.
Figure 6B:
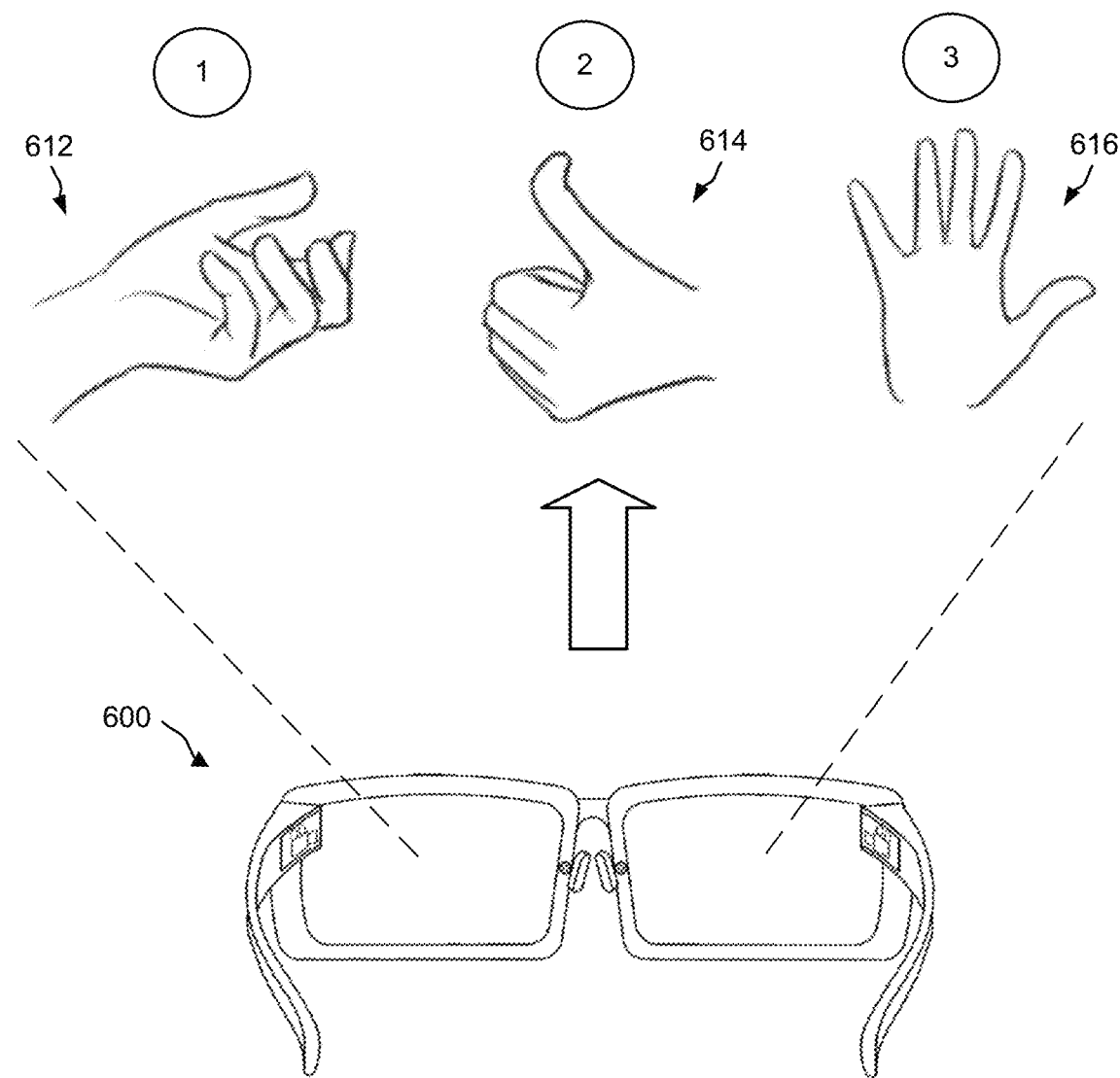

In another illustrative example, the XR system 100 can help a user interact with a thermostat. FIG. 6A and FIG. 6B are diagrams illustrating an example of a user using an XR system 600 to interact with a thermostat 610. For example, the thermostat 610 can be configured to interpret one or more gestures using gesture recognition and can perform one or more functions based on detected gestures. However, the user may not know the correct gesture commands that can be used to cause the thermostat 610 to perform certain functions. Similar to that described above, the XR system 600 use obtained context information to determine that the user is having trouble interacting with the thermostat 610. For instance, the XR system 600 may use eye tracking to determine that the user is staring at the thermostat 610 and/or can process one or more images to determine that the user is performing gestures (e.g., using hand 605) but the thermostat is not performing any functions based on the gestures. The XR system 600 can use any other context information to determine the user is having difficulty interacting with the thermostat 610.

In some cases, the user may issue a voice command or other input identifying the interaction the user wishes to perform with the thermostat 610. For instance, the user may recite "Set temperature to 68 degrees" and the XR system 600 can recognize the voice command. The XR system 600 can determine the gesture commands that the thermostat 610 is configured to interpret, such as from the thermostat 610, from a server associated with the thermostat 610 (e.g., a Nest™ server associated with a Nest™ thermostat).

As shown in FIG. 6B, in response to recognizing the voice command, receiving another input indicating the user's desired setting, and/or determining the user is having difficult interacting with the thermostat 610, the XR system 600 can present the user with a set of gesture commands (including gesture command 612, gesture command 614, and gesture command 616) that can be applied (e.g., with or without voice commands) to cause the thermostat 610 to perform the desired functionality. In some cases, as shown in FIG. 6B, the gesture commands can have corresponding numbers indicating an order in which the gesture commands 612, 614, and 616 should be performed in order to cause the thermostat 610 to perform the desired functionality. For instance, the user may perform the gesture command 612 to cause the thermostat 610 to enter into a temperature adjustment mode. The user may then perform the gesture command 614 to cause the thermostat 610 to increase the temperature. For instance, each time the user performs the "thumbs up" gesture command 614, the thermostat 610 may cause the temperature to increase by one degree Fahrenheit. The user may then perform the gesture command 616 to cause the thermostat 610 to exit the temperature adjustment mode.

Figure 7A:
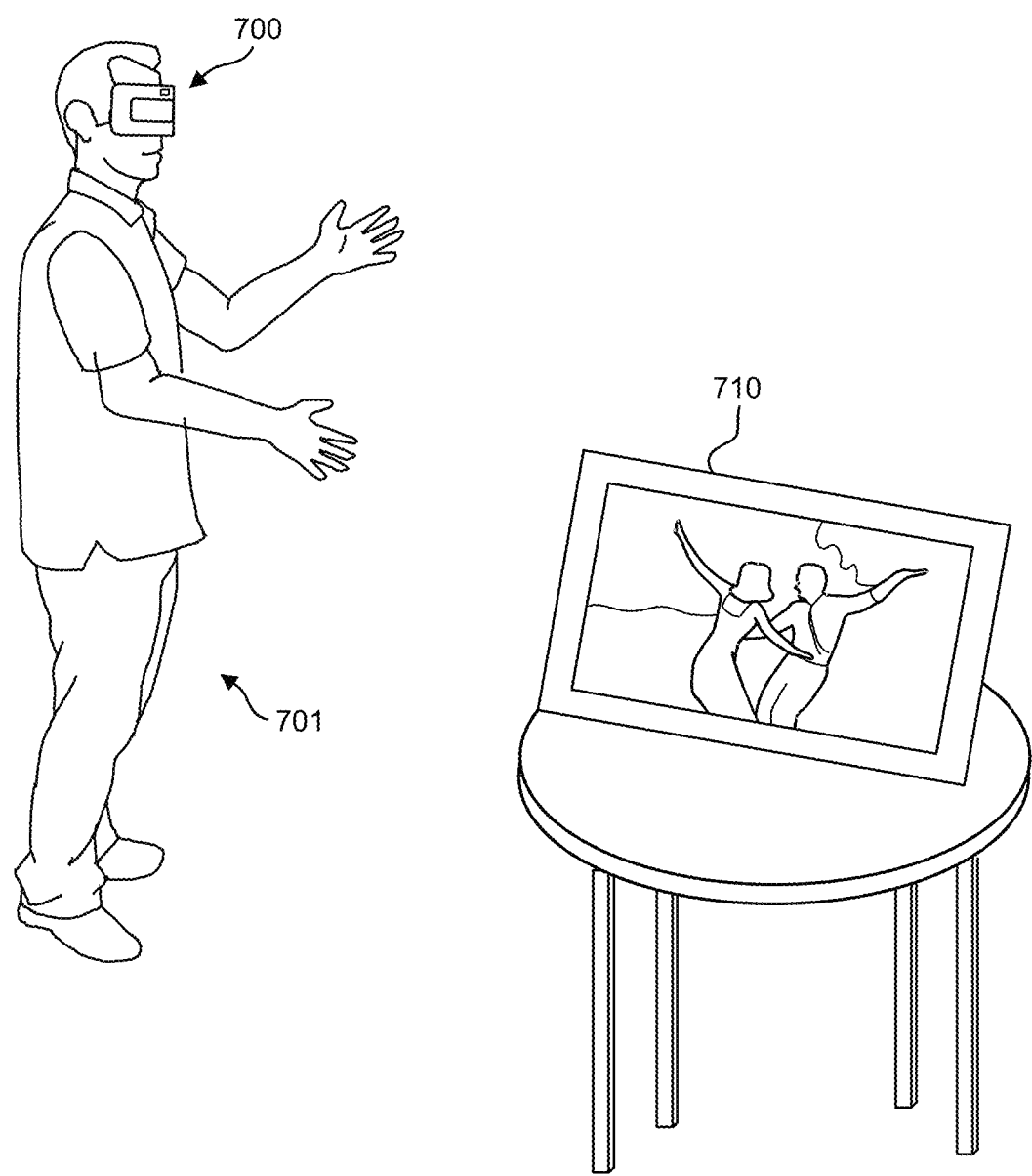
FIG. 7A and FIG. 7B are diagrams illustrating an example of a user using an XR system that can determine whether to provide user interface input options for interacting with a picture frame, in accordance with some examples of the present disclosure.
Figure 7B:
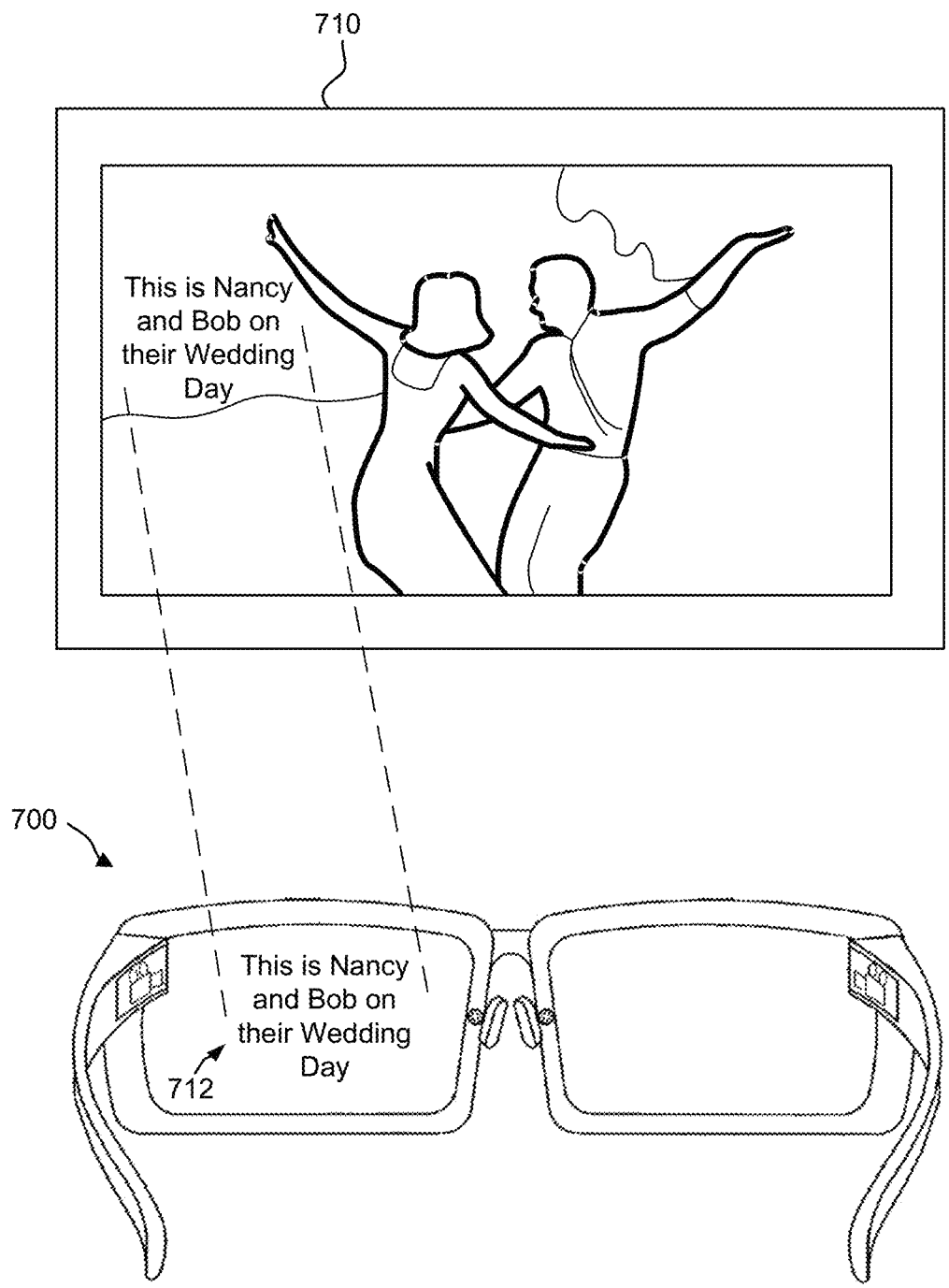

In another illustrative example, the XR system 100 can assist a user with interacting with digital picture frames. FIG. 7A and FIG. 7B are diagrams illustrating an example of a user 701 using an XR system 700 that can determine whether to provide user interface input options for interacting with a digital picture frame 710. For example, the digital picture frame 710 can be configured to display metadata (e.g., a description of displayed art, a background, a person(s), etc.) relating to the content being displayed by the digital picture frame 710. For instance, as shown in FIG. 7B, the digital picture frame 710 can display metadata 712 with the caption "This is Nancy and Bob on their Wedding Day" next to a picture of two people dancing.

The metadata may not be of interest to the user 701 if the user 701 is not gazing at the digital picture frame 710, if the user is in a rush walking by the digital picture frame 710, and/or otherwise likely not interested in the metadata 712. The XR system 700 can obtain context information, such as detected eye gaze indicating the user is not looking at the digital picture frame 710, sensed motion indicating the user walking, a calendar of the user 701 (e.g., indicating the user has an upcoming appointment at a different location), preferences of the user 701, user historical data, user communications, and/or other context information. Based on the context information obtained by the XR system 700, the XR system 700 can determine that the user is walking by the digital picture frame 710, that the user is not looking at the digital picture frame 710, and/or that the user is otherwise likely not interested in the metadata 712. The XR system 700 can then send a command to the digital picture frame 710 to prevent the digital picture frame 710 from presenting the metadata 712 (which may potentially be distracting to the user).

Figure 8A:
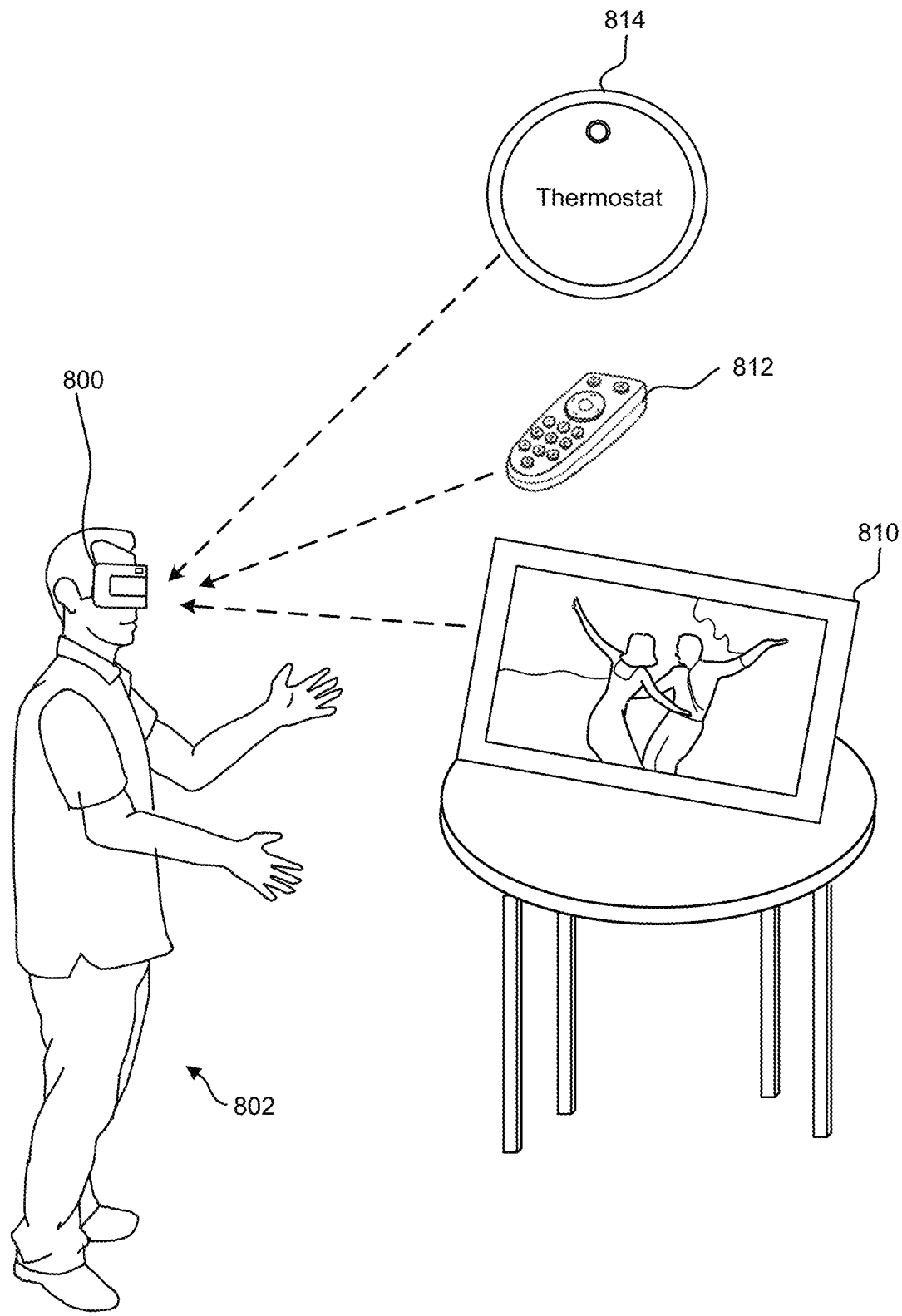
FIGS. 8A through 8D are diagrams illustrating example of a user using an extended reality system to interact with one or more devices when there are multiple devices in a scene, in accordance with some examples of the present disclosure.

FIG. 8A is a diagram illustrating an example of a user 802 using an XR system 800 to interact with one or more devices when there are multiple devices in a scene. In this example, the scene includes a digital picture frame 810, a remote control 812, and a digital thermostat 814. The user 802 can use the XR system 800 to interact with any of the devices in the scene, including the digital picture frame 810, the remote control 812, and/or the digital thermostat 814. The XR system 800 can receive input options and/or associated data from the digital picture frame 810, the remote control 812, and the digital thermostat 814, and can present user guidance data associated with input options corresponding to the digital picture frame 810, the remote control 812, and/or the digital thermostat 814.

In some cases, when the scene includes multiple remote devices as shown in FIG. 8A, the XR system 800 may have difficulty determining which of the multiple devices in the scene the user 802 wishes to interact with and/or the XR system 800 should present guidance data for. In some examples, the XR system 800 can receive input options from the digital picture frame 810, the remote control 812, and the digital thermostat 814. The input options can include information about the types of inputs available/acceptable at the digital picture frame 810, the remote control 812, and the digital thermostat 814. However, when receiving such data from multiple devices in a scene, the XR system 800 can be overloaded with data from the multiple devices. The data overload can make it difficult for the XR system 800 to present relevant information to the user 802, present information to the user without significant clutter, manage data and/or interactions with the devices, etc.

Figure 8B:
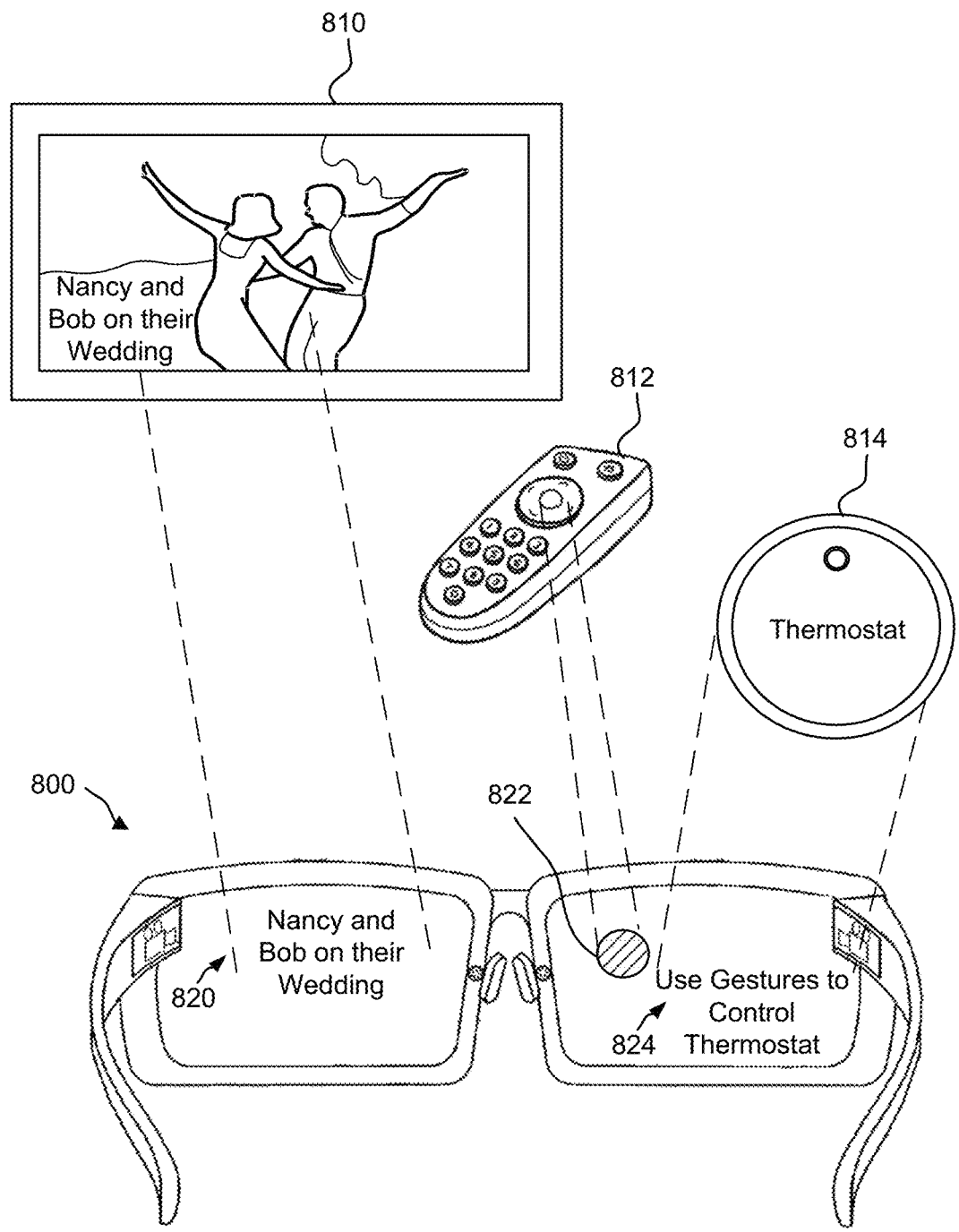

For example, with reference to FIG. 8B, the XR system 800 can display data 820 relating to the digital picture frame 810, data 822 relating to the remote control 812, and data 824 relating to the digital thermostat 814. The data 820, 822, and 824 can become overwhelming for the XR system 800 and/or the user 802. For example, as shown in FIG. 8B, when presented by the XR system 800, the data 820, 822, and 824 can become cluttered and the rendered information by the XR system 800 can become overloaded and difficult to parse, manage, understand, etc. In some examples, the XR system 800 can filter data from digital picture frame 810, the remote control 812, and the digital thermostat 814 to simplify and/or unify the data presented by the XR system 800 for the digital picture frame 810, the remote control 812, and the digital thermostat 814. In some cases, the XR system 800 can limit the data presented to the data corresponding to a particular device of relevance.

Figure 8C:
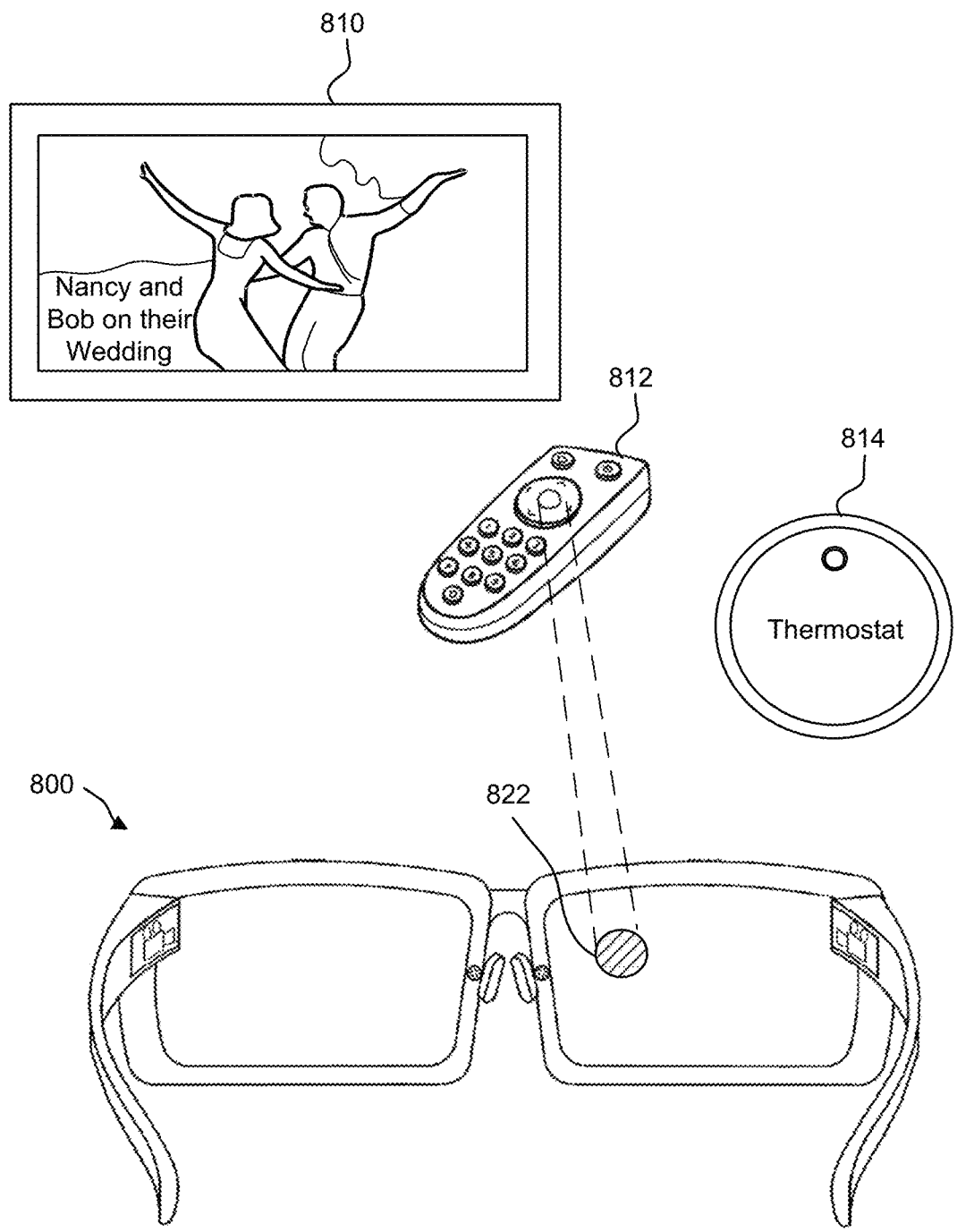

To illustrate, with reference to FIG. 8C, the XR system 800 can predict that the user wishes to interact with or will interact with the remote device 812. The XR system 800 can use this information to filter out the data 820 associated with the digital picture frame 810 and the data 824 associated with the digital thermostat 814 in order to simplify the data presented by the XR system 800. The XR system 800 can present the data 822 associated with the remote device 812, which is predicted to be relevant to the user 802 and/or the current context. In some examples, the data 822 can include an input option that the user can use to interact with the remote control 812 and/or an indication of an input option that informs the user how to interact with the remote control 812. In some cases, the data 822 can include user guidance data to facilitate user interactions with the remote device 812. In some examples, the presentation shown in FIG. 8C can declutter and/or simplify the data presented by the XR system 800.

In some cases, the XR system 800 can use context information to predict which of the digital picture frame 810, the remote control 812, and the digital thermostat 814 the user 802 will interact with, is relevant to the user 802, etc., and/or which data from the digital picture frame 810, the remote control 812, and/or the digital thermostat 814 to present to the user. In some cases, the XR system 800 can present simplified information related to the digital picture frame 810, the remote control 812, and the digital thermostat 814, which the XR system 800 and the user 802 can use to filter out less relevant information and reduce the amount of information presented to the user 802 to the information most relevant to the user 802.

Figure 8D:
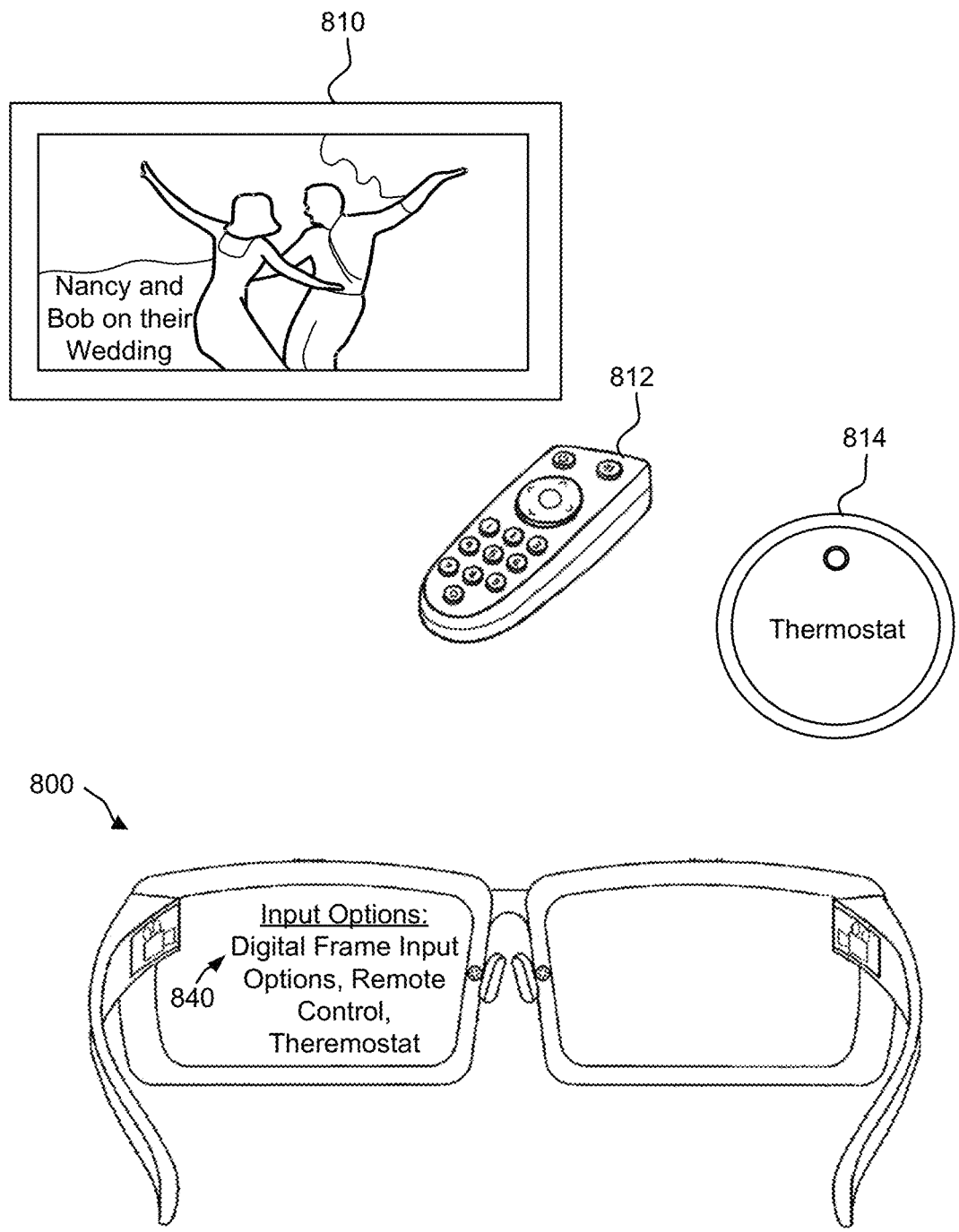

For example, with reference to FIG. 8D, the XR system 800 can present a menu 840 of input options. The menu 840 can indicate the various devices available for user interactions, and provide the user 802 the ability to select a particular device of interest to the user. If the user selects a particular device, the XR system 800 can present data, such as input options, corresponding to that particular device. For example, if the user 802 selects the digital frame 810 from the menu 840, the XR system 800 can then present the data relevant to the digital frame 810 and exclude other data relevant to the remote control 812 and/or the thermostat 814.

In another illustrative example, the XR system 100 can assist a user with using car controls. For example, a user driving a vehicle may pull over to the side of a road. The XR system 100 can detect that the user pulled over to the side of the road (e.g., based on motion information, voice data from the user, data from the vehicle, etc.). Based on determining that the user pulled the vehicle to the side of the road, the XR system 100 can determine that the user should activate the hazard lights on the vehicle. The user may scan the dashboard of the vehicle for the hazard lights button. The XR system 100 can use eye tracking, image analysis, and/or other technique to determine that the user cannot find or is having difficulty finding the hazard lights button. The XR system 100 can use such context information to determine that the user needs help finding the hazard lights button. The XR system 100 can localize/identify the hazard lights button and overlay AR content around the hazard lights button to guide/assist the user in locating the hazard button.

While certain illustrative examples are described above of the XR system 100 (and other XR systems) using input data and context information to determine input options to present to a user, the XR system 100 can perform any other functionality based on input data and context information to assist a user of XR system 100 in interacting with one or more other devices.

FIG. 9 is a flowchart illustrating an example of a process 900 for presenting information associated with at least one input option using one or more of the techniques described herein. At block 802, the process 900 can include receiving data identifying one or more input options associated with a device in a scene. For example, an XR system (e.g., XR system 100) can receive data identifying what input options are available at one or more remote devices in a scene.

At block 904, the process 900 can include determining, including using at least one memory, information relevant to at least one of the scene, the device, and a user associated with an electronic device (e.g., XR system 100). In some examples, the information can include context information. The context information can provide, for example, information about the scene, the user, the device, and/or the electronic device.

At block 906, the process 900 can include, based on the one or more input options and the information, outputting user guidance data corresponding to an input option for which relevant context information has been determined. In some examples, the user guidance data can include at least one of a user input element associated with the input option, a virtual overlay on a physical object associated with the input option, and/or a cue indicating how to provide an input associated with the input option.

In some aspects, the process 900 can include predicting, based on the information, a user interaction with the device; and presenting the user guidance data corresponding to the input option based on the one or more input options and the predicted user interaction.

In some examples, the device can include a connected device with network communication capabilities, and the process 900 can include determining, based on the information and the one or more input options, a hand gesture that represents a predicted user interaction; and presenting the user guidance data. In some examples, the predicted user interaction can include a predicted user input to the device. In some cases, the user guidance data can include an indication of the hand gesture that, when detected, invokes an actual user input at the device.

In some aspects, presenting the user guidance data can include rendering, at a display associated with the electronic device, a virtual overlay configured to appear to be located on a surface of the device. In some examples, the virtual overlay can include a user interface element associated with the input option. In some cases, the user interface element can include at least one of a virtual user input object associated with the input option and a visual indication of a physical control object on the device configured to receive the input corresponding to the input option.

In some examples, the information includes at least one of an eye gaze of the user and a pose of the user, and the process 900 can include predicting a user interaction with the device based on at least one of the eye gaze of the user and the pose of the user; after presenting the user guidance data, detecting an actual user input associated with the input option, the actual user input representing the predicted user interaction; and transmitting, to the device, a command corresponding to the actual user input associated with the input option.

In some examples, outputting the user guidance data corresponding to the input option can include displaying the user guidance data. In some examples, outputting the user guidance data corresponding to the input option can include outputting audio data representing the user guidance data.

In some examples, outputting the user guidance data corresponding to the input option can include displaying the user guidance data; and outputting audio data associated with the displayed user guidance data.

In some aspects, the process 900 can include receiving, from the device, data identifying the one or more input options associated with the device. In some aspects, the process 900 can include receiving, from a server, the data identifying the one or more input options associated with the device.

In some cases, the device has no external user interface for receiving one or more user inputs. In some aspects, the process 900 can include refraining, based on the information, from presenting additional user guidance data associated with the device.

In some aspects, the process 900 can include, after presenting the user guidance data, obtaining a user input associated with the input option; and transmitting, to the device, an instruction corresponding to the user input. In some cases, the instruction can be configured to control one or more operations of the device.

In some examples, the processes described herein (e.g., process 900 and/or other process described herein) may be performed by a computing device or apparatus. In one example, the process 900 can be performed by the XR system 100 of FIG. 1. In another example, the process 900 can be performed by a computing device with the computing system 1000 shown in FIG. 10. For instance, a computing device with the computing architecture shown in FIG. 10 can include the components of the XR system 100 of FIG. 1 and can implement the operations of FIG. 9.

The computing device can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a television, and/or any other computing device with the resource capabilities to perform the processes described herein, including the process 800. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 900 is illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 900 and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 10:
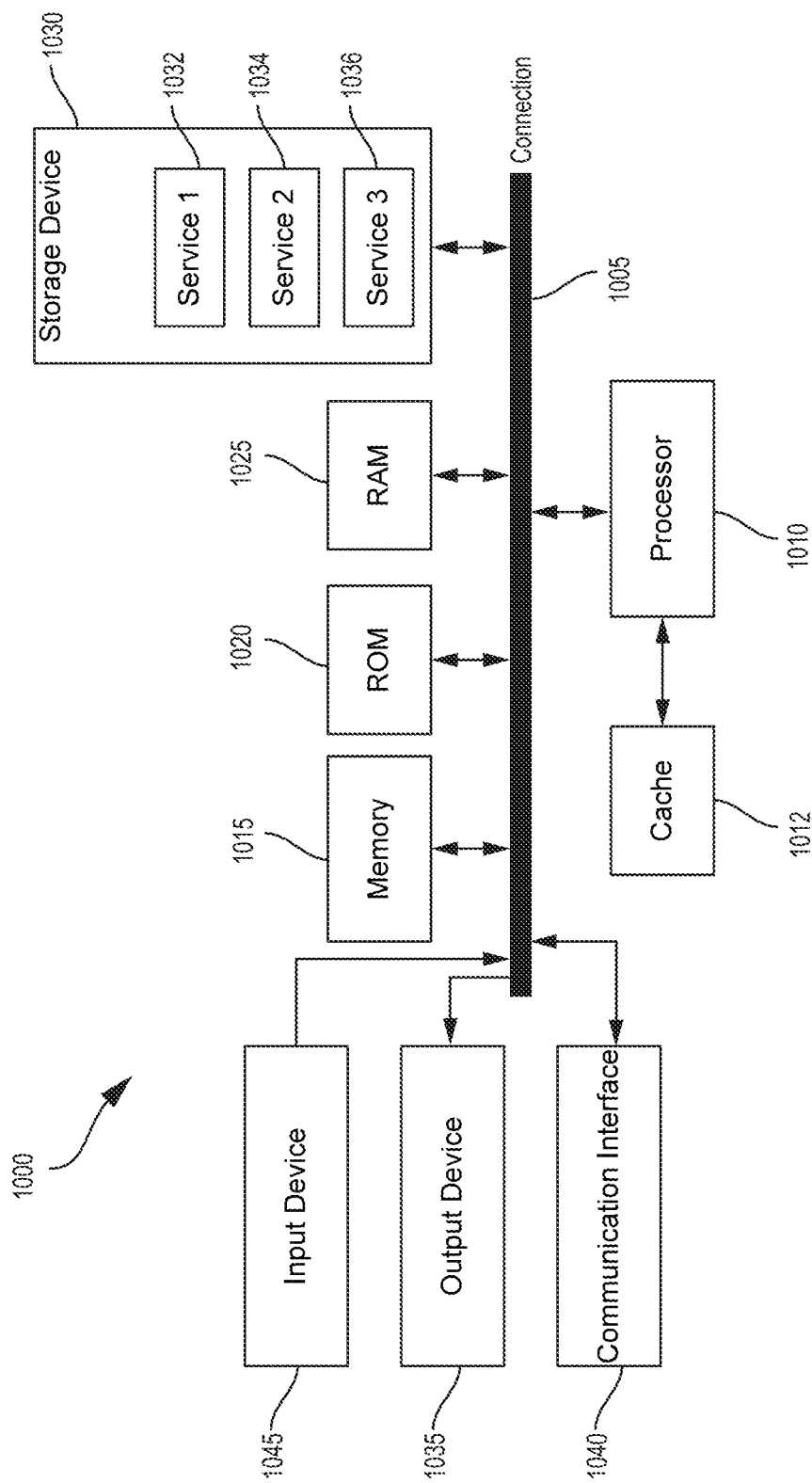
FIG. 10 illustrates an example computing system, in accordance with some examples of the present disclosure.

FIG. 10 is a diagram illustrating an example of a system for implementing certain aspects of the present technology. In particular, FIG. 10 illustrates an example of computing system 1000, which can be for example any computing device making up internal computing system, a remote computing system, a camera, or any component thereof in which the components of the system are in communication with each other using connection 1005. Connection 1005 can be a physical connection using a bus, or a direct connection into processor 1010, such as in a chipset architecture. Connection 1005 can also be a virtual connection, networked connection, or logical connection.

In some embodiments, computing system 1000 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1000 includes at least one processing unit (CPU or processor) 1010 and connection 1005 that couples various system components including system memory 1015, such as read-only memory (ROM) 1020 and random access memory (RAM) 1025 to processor 1010. Computing system 1000 can include a cache 1012 of high-speed memory connected directly with, in close proximity to, or integrated as part of processor 1010.

Processor 1010 can include any general purpose processor and a hardware service or software service, such as services 1032, 1034, and 1036 stored in storage device 1030, configured to control processor 1010 as well as a special-purpose processor where software instructions are incorporated into the actual processor design. Processor 1010 may essentially be a completely self-contained computing system, containing multiple cores or processors, a bus, memory controller, cache, etc. A multi-core processor may be symmetric or asymmetric.

To enable user interaction, computing system 1000 includes an input device 1045, which can represent any number of input mechanisms, such as a microphone for speech, a touch-sensitive screen for gesture or graphical input, keyboard, mouse, motion input, speech, etc. Computing system 1000 can also include output device 1035, which can be one or more of a number of output mechanisms. In some instances, multimodal systems can enable a user to provide multiple types of input/output to communicate with computing system 1000. Computing system 1000 can include communications interface 1040, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1040 may also include one or more Global Navigation Satellite System (GNSS) receivers or transceivers that are used to determine a location of the computing system 1000 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1030 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1030 can include software services, servers, services, etc., that when the code that defines such software is executed by the processor 1010, it causes the system to perform a function. In some embodiments, a hardware service that performs a particular function can include the software component stored in a computer-readable medium in connection with the necessary hardware components, such as processor 1010, connection 1005, output device 1035, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the present disclosure include:

Aspect 1. An apparatus for outputting information associated with at least one input option, comprising: at least one memory; and at least one processor coupled to the at least one memory, the at least one processor configured to: receive data identifying one or more input options associated with a device in a scene; determine, including using at least one memory, information relevant to at least one of the scene, the device, and a user associated with the apparatus; and based on the one or more input options and the information, output user guidance data corresponding to an input option for which relevant context information has been determined.

Aspect 2. The apparatus of Aspect 1, wherein, to receive data identifying one or more input options, the at least one processors is configured to: perform object recognition in a scene to identify one or more input options for operating an object.

Aspect 3. The apparatus of Aspect 2, wherein the object is at least one of within a threshold proximity to the user and within a field-of-view (FOV) of the user.

Aspect 4. The apparatus of any of Aspects 1 to 3, wherein the at least one processor is configured to: detect one or more additional devices in the scene; based on the information, determine a confidence value predicting whether the user will interact with the device or the one or more additional devices; and in response to the determined confidence value exceeding a threshold, predict a user interaction with the device.

Aspect 5. The apparatus of Aspect 4, wherein the at least one processor is configured to: in response to predicting the user interaction with the device, filter content associated with the one or more additional devices; and output content associated with the device.

Aspect 6. The apparatus of any of Aspects 4 to 5, wherein the at least one processor is configured to discern which of the device and the one or more additional devices the user is predicted to interact with.

Aspect 7. The apparatus of any of Aspects 4 to 6, wherein the at least one processor is configured to simplify a presentation of user interface content to avoid at least one of an overload of content, confusion, and content clutter.

Aspect 8. The apparatus of any of Aspects 1 to 7, wherein the device comprises a connected device with network communication capabilities, and the at least one processor is configured to: based on the information and the one or more input options, determine a hand gesture that represents a predicted user interaction, the predicted user interaction comprising a predicted user input to the device; and present the user guidance data, wherein the user guidance data comprises an indication of the hand gesture that, when detected, invokes an actual user input at the device.

Aspect 9. The apparatus of any of Aspects 1 to 8, wherein the user guidance data comprises at least one of a user input element associated with the input option, a virtual overlay on a physical object associated with the input option, and a cue indicating how to provide an input associated with the input option.

Aspect 10. The apparatus of Aspect 7, wherein the at least one processor is configured to: based on the information, predict a user interaction with the device; and present the user guidance data corresponding to the input option based on the one or more input options and the predicted user interaction.

Aspect 11. The apparatus of any of Aspects 1 to 10, wherein, to present the user guidance data, the at least one processor is configured to: render, at a display associated with the apparatus, a virtual overlay configured to appear to be located on a surface of the device, the virtual overlay comprising a user interface element associated with the input option, wherein the user interface element comprises at least one of a virtual user input object associated with the input option and a visual indication of a physical control object on the device configured to receive the input corresponding to the input option.

Aspect 12. The apparatus of any of Aspects 1 to 11, wherein the information comprises at least one of an eye gaze of the user and a pose of the user, the at least one processor being configured to: predict a user interaction with the device based on at least one of the eye gaze of the user and the pose of the user; after presenting the user guidance data, detect an actual user input associated with the input option, the actual user input representing the predicted user interaction; and transmit, to the device, a command corresponding to the actual user input associated with the input option.

Aspect 13. The apparatus of any of Aspects 1 to 12, wherein, to output the user guidance data corresponding to the input option, the at least one processor is configured to: display the user guidance data.

Aspect 14. The apparatus of any of Aspects 1 to 13, wherein, to output the user guidance data corresponding to the input option, the at least one processor is configured to: output audio data representing the user guidance data.

Aspect 15. The apparatus of any of Aspects 1 to 14, wherein, to output the user guidance data corresponding to the input option, the at least one processor is configured to: display the user guidance data; and output audio data associated with the displayed user guidance data.

Aspect 16. The apparatus of any of Aspects 1 to 15, wherein the at least one processor is configured to: receive, from the device, data identifying the one or more input options associated with the device.

Aspect 17. The apparatus of any of Aspects 1 to 16, wherein the at least one processor is configured to: receive, from a server, the data identifying the one or more input options associated with the device.

Aspect 18. The apparatus of any of Aspects 1 to 17, wherein the device has no external user interface for receiving one or more user inputs.

Aspect 19. The apparatus of any of Aspects 1 to 18, wherein the at least one processor is configured to: based on the information, refrain from presenting additional user guidance data associated with the device.

Aspect 20. The apparatus of any of Aspects 1 to 19, wherein the apparatus is an extended reality device.

Aspect 21. The apparatus of any of Aspects 1 to 20, further comprising a display.

Aspect 22. The apparatus of Aspect 21, wherein the display is configured to display at least the user guidance data.

Aspect 23. The apparatus of any of Aspects 1 to 22, wherein the at least one processor is configured to: after presenting the user guidance data, obtain a user input associated with the input option; and transmit, to the device, an instruction corresponding to the user input, the instruction being configured to control one or more operations of the device.

Aspect 24. The apparatus of any of Aspects 1 to 23, wherein the information relevant to at least one of the scene, the device, and the user includes at least one of a predicted user interaction with the device, one or more actions of the user in the scene, characteristics associated with the user, historical information associated with the user and the device, a user interface capability of the device, information associated with the device, and information associated with the scene.

Aspect 25. The apparatus of any of Aspects 1 to 24, wherein the at least one processor is configured to: detect one or more additional devices in the scene; based on the context information, determine a confidence value indicating a likelihood of the user interacting with with the device or the one or more additional devices; and in response to the determined confidence value exceeding a threshold, predict the user interaction.

Aspect 26. The apparatus of any of Aspects 1 to 25, wherein the at least one processor is further configured to:

receive confirmation from the user for the user interaction data; interact with the device in response to the confirmation from the user.

Aspect 27. The apparatus of Aspect 26, wherein the confirmation is an audio confirmation.

Aspect 28. The apparatus of any of Aspects 26 to 27, wherein the confirmation is a user input received at the apparatus.

Aspect 29. A method for outputting information associated with at least one input option, comprising: receiving data identifying one or more input options associated with a device in a scene; determining, including using at least one memory, information relevant to at least one of the scene, the device, and a user associated with an electronic device; and based on the one or more input options and the information, outputting user guidance data corresponding to an input option for which relevant context information has been determined.

Aspect 30. The method of Aspect 29, wherein receiving data identifying one or more input options comprises: performing object recognition in a scene to identify one or more input options for operating an object.

Aspect 31. The method of Aspect 30, wherein the object is at least one of within a threshold proximity to the user and within a field-of-view (FOV) of the user.

Aspect 32. The method of any of Aspects 29 to 31, further comprising: detecting one or more additional devices in the scene; based on the information, determining a confidence value predicting whether the user will interact with the device or the one or more additional devices; and in response to the determined confidence value exceeding a threshold, predicting a user interaction with the device.

Aspect 33. The method of any of Aspects 29 to 32, further comprising: in response to predicting the user interaction with the device, filtering content associated with the one or more additional devices; and outputting content associated with the device.

Aspect 34. The method of any of Aspects 29 to 33, further comprising discerning which of the device and the one or more additional devices the user is predicted to interact with.

Aspect 35. The method of Aspect 34, further comprising simplifying a presentation of user interface content to avoid at least one of an overload of content, confusion, and content clutter.

Aspect 36. The method of any of Aspects 29 to 35, wherein the user guidance data comprises at least one of a user input element associated with the input option, a virtual overlay on a physical object associated with the input option, and a cue indicating how to provide an input associated with the input option.

Aspect 37. The method of any of Aspects 29 to 36, further comprising: based on the information, predicting a user interaction with the device; and presenting the user guidance data corresponding to the input option based on the one or more input options and the predicted user interaction.

Aspect 38. The method of Aspect 37, wherein the device comprises a connected device with network communication capabilities, and the method further comprises: based on the information and the one or more input options, determining a hand gesture that represents a predicted user interaction, the predicted user interaction comprising a predicted user input to the device; and presenting the user guidance data, wherein the user guidance data comprises an indication of the hand gesture that, when detected, invokes an actual user input at the device.

Aspect 39. The method of any of Aspects 29 to 38, wherein presenting the user guidance data comprises: rendering, at a display associated with the electronic device, a virtual overlay configured to appear to be located on a surface of the device, the virtual overlay comprising a user interface element associated with the input option, wherein the user interface element comprises at least one of a virtual user input object associated with the input option and a visual indication of a physical control object on the device configured to receive the input corresponding to the input option.

Aspect 40. The method of any of Aspects 29 to 39, wherein the information comprises at least one of an eye gaze of the user and a pose of the user, the method further comprising: predicting a user interaction with the device based on at least one of the eye gaze of the user and the pose of the user; after presenting the user guidance data, detecting an actual user input associated with the input option, the actual user input representing the predicted user interaction; and transmitting, to the device, a command corresponding to the actual user input associated with the input option.

Aspect 41. The method of any of Aspects 29 to 40, wherein outputting the user guidance data corresponding to the input option comprises: displaying the user guidance data.

Aspect 42. The method of any of Aspects 29 to 41, wherein outputting the user guidance data corresponding to the input option comprises: outputting audio data representing the user guidance data.

Aspect 43. The method of any of Aspects 29 to 42, wherein outputting the user guidance data corresponding to the input option comprises: displaying the user guidance data; and outputting audio data associated with the displayed user guidance data.

Aspect 44. The method of any of Aspects 29 to 43, further comprising: receiving, from the device, data identifying the one or more input options associated with the device.

Aspect 45. The method of any of Aspects 29 to 44, further comprising: receiving, from a server, the data identifying the one or more input options associated with the device.

Aspect 46. The method of any of Aspects 29 to 45, wherein the device has no external user interface for receiving one or more user inputs.

Aspect 47. The method of any of Aspects 29 to 46, further comprising: based on the information, refraining from presenting additional user guidance data associated with the device.

Aspect 48. The method of any of Aspects 29 to 47, further comprising: after presenting the user guidance data, obtaining a user input associated with the input option; and transmitting, to the device, an instruction corresponding to the user input, the instruction being configured to control one or more operations of the device.

Aspect 49. The method of any of Aspects 29 to 48, wherein the information relevant to at least one of the scene, the device, and the user includes at least one of a predicted user interaction with the device, one or more actions of the user in the scene, characteristics associated with the user, historical information associated with the user and the device, a user interface capability of the device, information associated with the device, and information associated with the scene.

Aspect 50. The method of any of Aspects 29 to 49, further comprising: detecting one or more additional devices in the scene; based on the context information, determining a confidence value indicating a likelihood of the user interacting with with the device or the one or more additional devices; and in response to the determined confidence value exceeding a threshold, predicting the user interaction.

Aspect 51. The method of any of Aspects 29 to 50, further comprising: receive confirmation from the user for the user interaction data; interact with the device in response to the confirmation from the user.

Aspect 52. The method of Aspect 51, wherein the confirmation is an audio confirmation.

Aspect 53. The method of any of Aspects 51 to 52, wherein the confirmation is a user input received at the apparatus.

Aspect 54. A non-transitory computer-readable medium having stored thereon instructions that, when executed by one or more processors, cause the one or more processors to perform a method according to any of Aspects 29 to 53.

Aspect 55. An apparatus comprising means for performing a method according to any of Aspects 29 to 53.

What is claimed is:

1. An extended reality head-mounted apparatus for outputting information associated with at least one input option, comprising:
   a display;
   at least one sensor;
   at least one memory; and
   at least one processor coupled to the at least one memory, the at least one processor configured to:
   identify a device in a scene within a field-of-view of the at least one sensor;
   receive data identifying a plurality of input options associated with the device in the scene;
   determine, including using the at least one memory, context information relevant to at least one of the scene, the device, or a user associated with the extended reality head-mounted apparatus;
   filter the plurality of input options associated with the device based on the context information to determine one or more input options associated with the context information; and
   output user guidance data via the display, the user guidance data corresponding to an interaction with the device using the one or more input options associated with the context information.

2. The extended reality head-mounted apparatus of claim 1, wherein, to output the user guidance data, the at least one processor is configured to output, via the display, at least one of a user input element associated with the one or more input options, a virtual overlay on a physical object associated with the one or more input options, or a cue indicating how to provide an input associated with the one or more input options.

3. The extended reality head-mounted apparatus of claim 1, wherein the at least one processor is configured to:
   based on the context information, predict a user interaction with the device; and
   output the user guidance data corresponding to the interaction with the device using the one or more input options based on the plurality of input options and the predicted user interaction.

4. The extended reality head-mounted apparatus of claim 1, wherein the device comprises a connected device with network communication capabilities, and the at least one processor is configured to:
   based on the context information and the plurality of input options, determine a hand gesture that represents a predicted user interaction, the predicted user interaction comprising a predicted user input to the device, wherein the user guidance data comprises an indication of the hand gesture that, when detected, invokes an actual user input at the device.

5. The extended reality head-mounted apparatus of claim 1, wherein, to output the user guidance data, the at least one processor is configured to:
   render, via the display, a virtual overlay configured to appear to be located on a surface of the device, the virtual overlay comprising a user interface element associated with the one or more input options, wherein the user interface element comprises at least one of a virtual user input object associated with the one or more input options or a visual indication of a physical control object on the device configured to receive input corresponding to the one or more input options.

6. The extended reality head-mounted apparatus of claim 1, wherein the context information comprises at least one of an eye gaze of the user or a pose of the user, the at least one processor being configured to:
   predict a user interaction with the device based on at least one of the eye gaze of the user or the pose of the user;
   based on outputting the user guidance data via the display, detect an actual user input associated with the one or more input options, the actual user input representing the predicted user interaction; and
   transmit, to the device, a command corresponding to the actual user input associated with the one or more input options.

7. The extended reality head-mounted apparatus of claim 1, wherein, to output the user guidance data corresponding to the interaction with the device using the one or more input options, the at least one processor is configured to:
   display the user guidance data via the display.

8. The extended reality head-mounted apparatus of claim 1, wherein, to output the user guidance data corresponding to the interaction with the device using the one or more input options, the at least one processor is configured to:
   output audio data representing the user guidance data.

9. The extended reality head-mounted apparatus of claim 1, wherein, to output the user guidance data corresponding to the interaction with the device using the one or more input options, the at least one processor is configured to:
   display the user guidance data via the display; and
   output audio data associated with the displayed user guidance data.

10. The extended reality head-mounted apparatus of claim 1, wherein the at least one processor is configured to:
    receive, from the device, the data identifying the plurality of input options associated with the device.

11. The extended reality head-mounted apparatus of claim 1, wherein the at least one processor is configured to:
    receive, from a server, the data identifying the plurality of input options associated with the device.

12. The extended reality head-mounted apparatus of claim 1, wherein the device has no external user interface for receiving one or more user inputs.

13. The extended reality head-mounted apparatus of claim 1, wherein the at least one processor is configured to:
    based on the context information, refrain from outputting additional user guidance data associated with the device.

14. The extended reality head-mounted apparatus of claim 1, wherein the at least one processor is configured to:
    based on outputting the user guidance data via the display, obtain a user input associated with the one or more input options; and
    transmit, to the device, an instruction corresponding to the user input, the instruction being configured to control one or more operations of the device.

15. A method for outputting information at an extended reality head-mounted device, the method comprising:
- identifying a device in a scene within a field-of-view of at least one sensor of the extended reality head-mounted device;
- receiving, at the extended reality head-mounted device, data identifying a plurality of input options associated with the device in the scene;
- determining, at the extended reality head-mounted device using at least one memory, context information relevant to at least one of the scene, the device, or a user associated with head-mounted device;
- filter the plurality of input options associated with the device based on the context information to determine one or more input options associated with the context information; and
- outputting user guidance data via a display of the extended reality head-mounted device, the user guidance data corresponding to interaction with the device using the one or more input options associated with the context information.

16. The method of claim 15, wherein the user guidance data output via the display comprises at least one of a user input element associated with the one or more input options, a virtual overlay on a physical object associated with the one or more input options, or a cue indicating how to provide an input associated with the one or more input options.

17. The method of claim 15, further comprising:
- based on the context information, predicting a user interaction with the device; and
- outputting the user guidance data corresponding to interaction with the device using the one or more input options based on the plurality of input options and the predicted user interaction.

18. The method of claim 17, wherein the device comprises a connected device with network communication capabilities, and the method further comprises:
- based on the context information and the plurality of input options, determining a hand gesture that represents a predicted user interaction, the predicted user interaction comprising a predicted user input to the device, wherein the user guidance data comprises an indication of the hand gesture that, when detected, invokes an actual user input at the device.

19. The method of claim 15, wherein outputting the user guidance data comprises:
- rendering, via the display, a virtual overlay configured to appear to be located on a surface of the device, the virtual overlay comprising a user interface element associated with the one or more input options, wherein the user interface element comprises at least one of a virtual user input object associated with the one or more input options or a visual indication of a physical control object on the device configured to receive input corresponding to the one or more input options.

20. The method of claim 15, wherein the context information comprises at least one of an eye gaze of the user or a pose of the user, the method further comprising:
- predicting a user interaction with the device based on at least one of the eye gaze of the user or the pose of the user;
- based on outputting the user guidance data via the display, detecting an actual user input associated with the one or more input options, the actual user input representing the predicted user interaction; and
- transmitting, to the device, a command corresponding to the actual user input associated with the one or more input options.

21. The method of claim 15, wherein outputting the user guidance data corresponding to interaction with the device using the one or more input options comprises:
- displaying the user guidance data via the display.

22. The method of claim 15, wherein outputting the user guidance data corresponding to interaction with the device using the one or more input options comprises:
- outputting audio data representing the user guidance data.

23. The method of claim 15, wherein outputting the user guidance data corresponding to interaction with the device using the one or more input options comprises:
- displaying the user guidance data via the display; and
- outputting audio data associated with the displayed user guidance data.

24. The method of claim 15, further comprising:
- receiving, from the device, the data identifying the plurality of input options associated with the device.

25. The method of claim 15, further comprising:
- receiving, from a server, the data identifying the plurality of input options associated with the device.

26. The method of claim 15, wherein the device has no external user interface for receiving one or more user inputs.

27. The method of claim 15, further comprising:
- based on the context information, refraining from outputting additional user guidance data associated with the device.

28. The method of claim 15, further comprising:
- based on outputting the user guidance data via the display, obtaining a user input associated with the one or more input options; and
- transmitting, to the device, an instruction corresponding to the user input, the instruction being configured to control one or more operations of the device.

* * * * *